(12) United States Patent
Saito et al.

(10) Patent No.: US 12,073,137 B2
(45) Date of Patent: Aug. 27, 2024

(54) INFORMATION PROCESSING APPARATUS, CONTROL METHOD FOR CONTROLLING INFORMATION PROCESSING APPARATUS, AND STORAGE MEDIUM FOR DISPLAYING A PRINT SETTING SCREEN

(71) Applicant: CANON KABUSHIKI KAISHA, Tokyo (JP)

(72) Inventors: Kazuyuki Saito, Kanagawa (JP); Shinya Suzuki, Chiba (JP); Akihiro Yasuda, Chiba (JP); Kazushige Shimada, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/298,708

(22) Filed: Apr. 11, 2023

(65) Prior Publication Data
US 2023/0333793 A1 Oct. 19, 2023

(30) Foreign Application Priority Data

Apr. 18, 2022 (JP) ................................ 2022-068064

(51) Int. Cl.
*G06F 3/12* (2006.01)
(52) U.S. Cl.
CPC .......... *G06F 3/1264* (2013.01); *G06F 3/1205* (2013.01); *G06F 3/1287* (2013.01)
(58) Field of Classification Search
None
See application file for complete search history.

(56) References Cited

U.S. PATENT DOCUMENTS

2021/0326087 A1* 10/2021 Inoue .................... G06F 3/1292

FOREIGN PATENT DOCUMENTS

| JP | 2020095535 A | 6/2020 |
|---|---|---|
| JP | 2021033526 A | 3/2021 |
| JP | 2021093079 A | 6/2021 |
| JP | 2021124791 A | 8/2021 |

* cited by examiner

*Primary Examiner* — Thomas D Lee
(74) *Attorney, Agent, or Firm* — Canon U.S.A., Inc. IP Division

(57) ABSTRACT

An information processing apparatus that stores a printer driver configured to generate image data to be transmitted according to a predetermined protocol includes a selection unit configured to select printer information regarding a single printer from stored printer information regarding a plurality of printers, a notification unit configured to give a notification to an application corresponding to the printer information selected by the selection unit, an acquisition unit configured to, based on an instruction given by the application having received the notification, acquire first capability information that is defined by a predetermined protocol and second capability information that is not defined by the predetermined protocol from a cloud print service, and a display unit configured to, based on the second capability information acquired by the acquisition unit, display an object that receives a print setting.

15 Claims, 18 Drawing Sheets

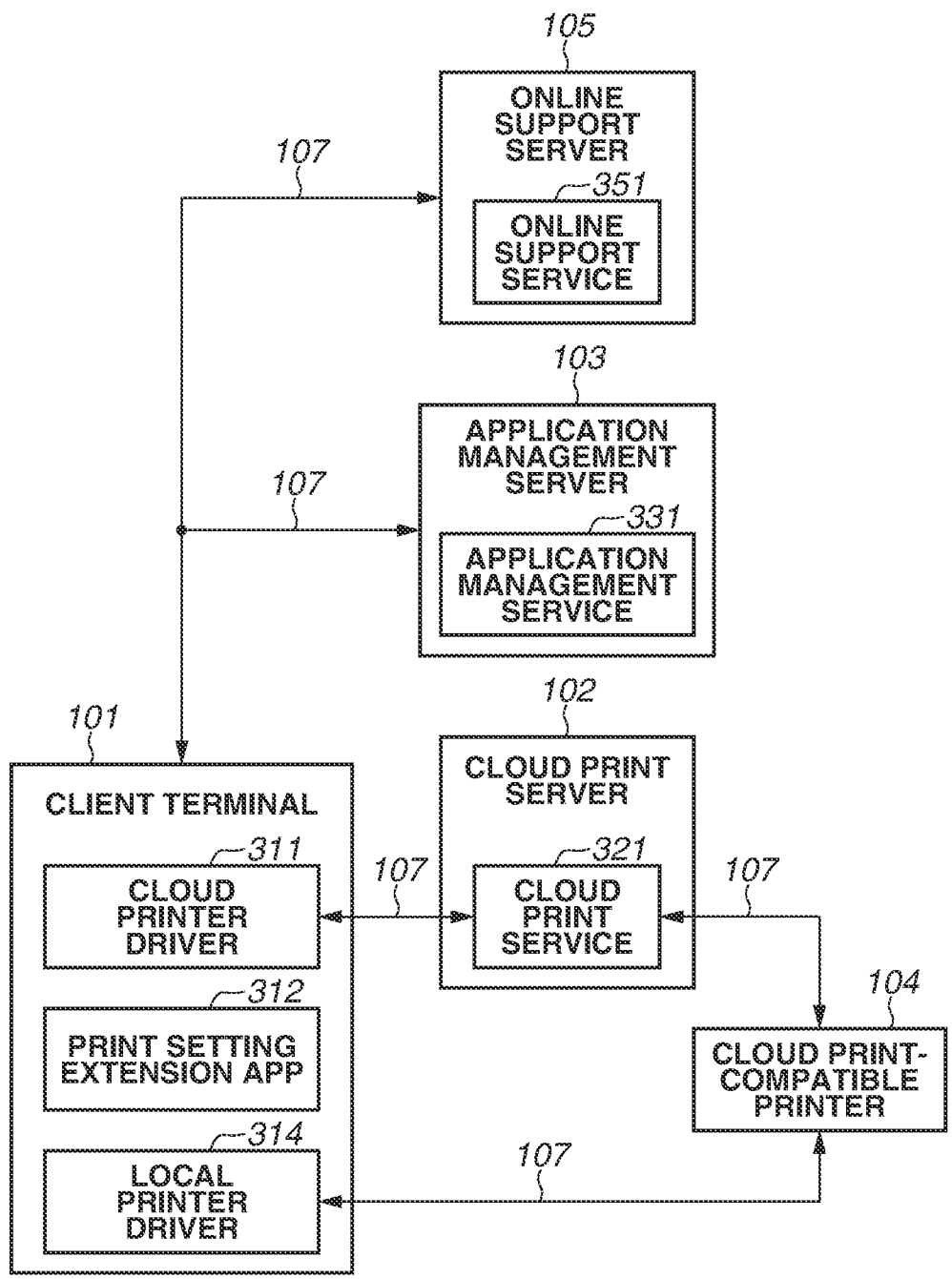

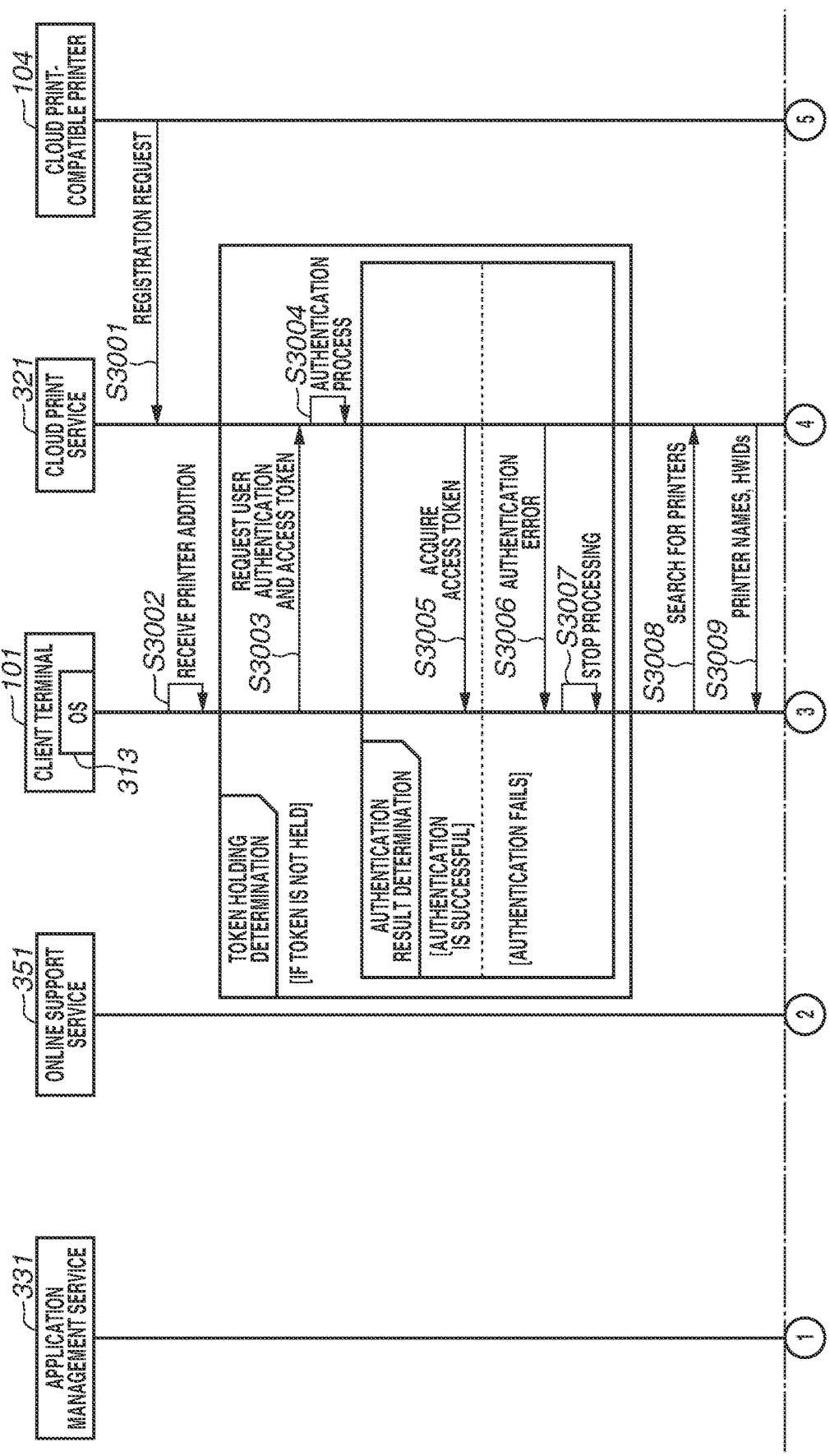

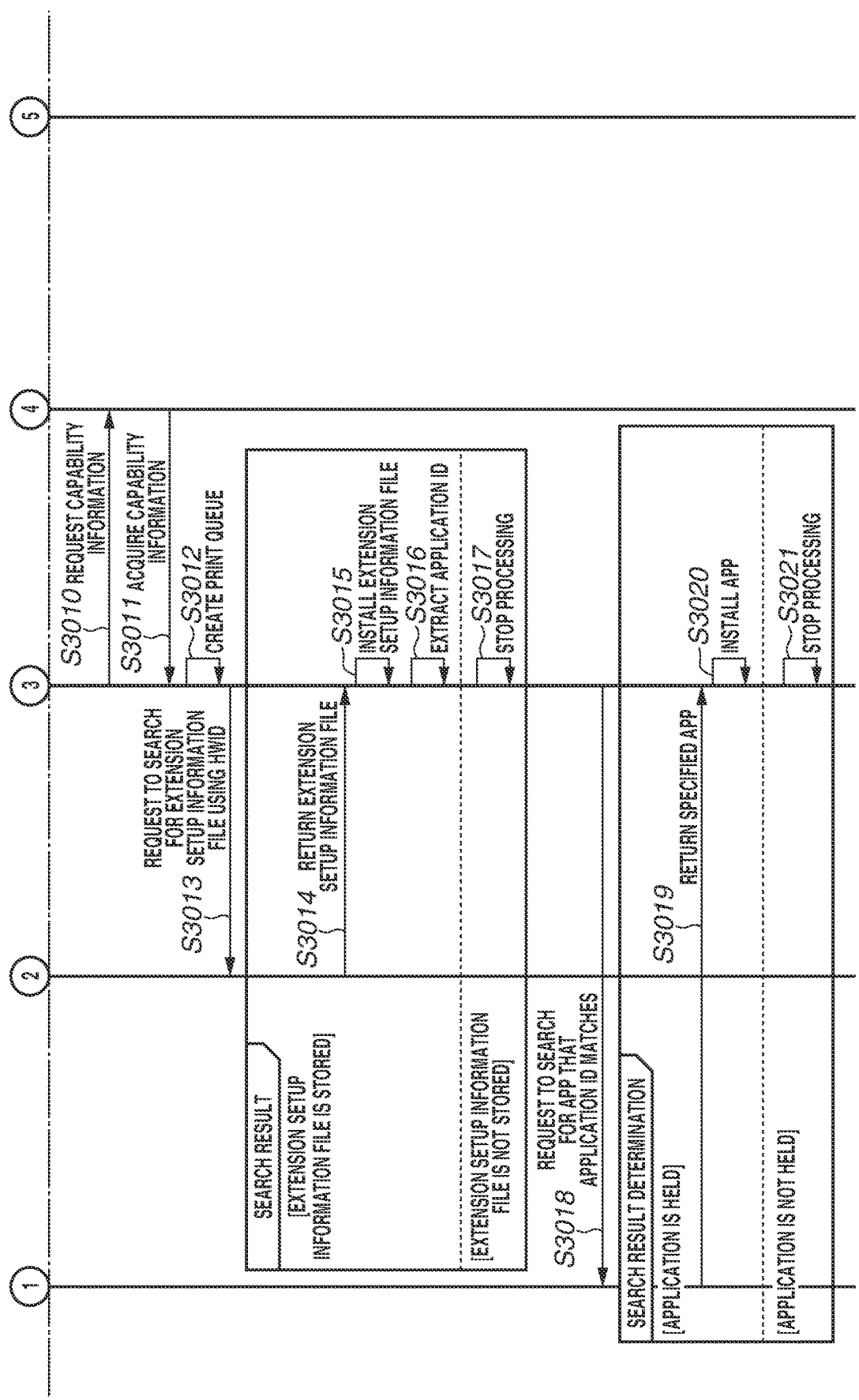

FIG.5

| Item Name | Attribute Value |
|---|---|
| 501 Sheet Size | A6/A5/A4/B5/Letter/Legal/Executive /Postcard/#10 Envelope Portrait /DL Envelope Portrait/Envelope (Western Style No. 4) Portrait /Envelope (Long Style No. 3) Portrait /Envelope (Long Style No. 4) Portrait/Envelope C5 Portrait /Envelope Monarch Portrait/L/4 × 6 (KG Size)/5 × 7 /Sixmo (8 × 10)/Square (127 mm)/Business Card (Card) /Envelope (Western Style No. 6) Portrait/Square (89 mm)/Square (4 × 4) |
| 502 Type of Sheet | Envelope/Label/Plain Paper/Photo Paper /Photo Paper Gloss Standard/Photo Paper Matte /Inkjet Postcard (Communication Side)/Inkjet Postcard (Address Side) /Inkjet Photo Postcard (Communication Side) /Inkjet Photo Postcard (Address Side) |
| 503 Number of Copies | Max = 99 |
| Orientation of Sheet | Portrait/Landscape |
| Print Quality | Standard/Draft |
| Print in Units of Copies | ON/OFF |
| Stapling | Absent/Automatic/Top Left/Bottom Left/Top Right/Bottom Right /Left End (2-Point Binding)/Top End (2-Point Binding) /Right End (2-Point Binding)/Bottom End (2-Point Binding)/Saddle Binding |
| Punching | Absent/Punched Holes (Automatic)/Punched Holes (2 Holes Left) /Punched Holes (3 Holes Left)/Punched Holes (4 Holes Left) /Punched Holes (Multi Left)/Punched Holes (2 Holes Right) /Punched Holes (3 Holes Right)/Punched Holes (4 Holes Right) /Punched Holes (Multi Right)/Punched Holes (2 Holes Top) /Punched Holes (3 Holes Top)/Punched Holes (4 Holes Top) /Punched Holes (Multi Top)/Punched Holes (2 Holes Bottom) /Punched Holes (3 Holes Bottom)/Punched Holes (4 Holes Bottom) /Punched Holes (Multi Bottom) |
| Folding setting | Absent/Half Fold/C-Fold/French Fold/External Tri-Fold/Z-Fold /Saddle Fold (Output from Saddle Finisher) |
| 504 Color Mode | Color/Monochrome |
| Page Aggregate | OFF/2in1/4in1/6in1/9in1/16in1 |
| Placement Order | Left to Right/Right to Left |
| Magnification | Absent/Fit to Page Horizontal Width/Fit to Size of Screen |
| Two-Sided Printing | One-Sided/Two-Sided |
| Binding Direction | Long-Side Binding/Short-Side Binding |
| 180-Degree Rotation | Absent/Left Rotation/Right Rotation |
| Save Job in Printer | ON/OFF |
| Shorten Job Name | ON/OFF |
| Stapleless Binding | ON/OFF |

FIG.6A

```xml
<?xml version="1.0" encoding="utf-8"?>
<PrintDeviceCapabilities
  xmlns:xsi="http://www.w3.org/2001/XMLSchema-instance"
  xmlns:xsd="http://www.w3.org/2001/XMLSchema"
  xmlns:xml="http://www.w3.org/XML/1998/namespace"
  xmlns:psk="http://schemas.microsoft.com/windows/2003/08/printing/printschemakeywords"
  xmlns:psk12="http://schemas.microsoft.com/windows/2013/12/printing/printschemakeywordsv12"
  xmlns:psf="http://schemas.microsoft.com/windows/2003/08/printing/printschemaframework"
  xmlns:psf2="http://schemas.microsoft.com/windows/2013/12/printing/printschemaframework2"
  xmlns="http://schemas.microsoft.com/windows/2013/12/printing/printschemaframework2"
  version="2">

<psk:JobCopiesAllDocuments psf2:psftype="ParameterDef">
    <psf:DataType xsi:type="xsd:QName" psf2:psftype="Property">xsd:integer</psf:DataType>
    <psf:DefaultValue xsi:type="xsd:integer" psf2:psftype="Property">1</psf:DefaultValue>
    <psf:Mandatory xsi:type="xsd:QName" psf2:psftype="Property">psk:Unconditional</psf:Mandatory>
    <psf:MaxValue xsi:type="xsd:integer" psf2:psftype="Property">999</psf:MaxValue>
    <psf:MinValue xsi:type="xsd:integer" psf2:psftype="Property">1</psf:MinValue>
    <psf:Multiple xsi:type="xsd:integer" psf2:psftype="Property">1</psf:Multiple>
    <psf:UnitType xsi:type="xsd:string" psf2:psftype="Property">copies</psf:UnitType>
  </psk:JobCopiesAllDocuments>

<psk:PageMediaSize psf2:psftype="Feature">
    <psk:ISOA4 psf2:psftype="Option">
      <psk12:PortraitImageableSize xsi:type="psf2:ImageableAreaType" psf2:psftype="Property">12700,12700,184600,271600</psk12:PortraitImageableSize>
      <psk:MediaSizeHeight xsi:type="xsd:integer" psf2:psftype="ScoredProperty">297000</psk:MediaSizeHeight>
      <psk:MediaSizeWidth xsi:type="xsd:integer" psf2:psftype="ScoredProperty">210000</psk:MediaSizeWidth>
    </psk:ISOA4>
    <psk:NorthAmericaLetter psf2:psftype="Option" psf2:default="true">
      <psk12:PortraitImageableSize xsi:type="psf2:ImageableAreaType" psf2:psftype="Property">12700,12700,190500,254000</psk12:PortraitImageableSize>
      <psk:MediaSizeHeight xsi:type="xsd:integer" psf2:psftype="ScoredProperty">279400</psk:MediaSizeHeight>
      <psk:MediaSizeWidth xsi:type="xsd:integer" psf2:psftype="ScoredProperty">215900</psk:MediaSizeWidth>
    </psk:NorthAmericaLetter>
  </psk:PageMediaSize>

<psk:PageOrientation psf2:psftype="Feature">
    <psk:Landscape psf2:psftype="Option"/>
    <psk:Portrait psf2:psftype="Option" psf2:default="true"/>
  </psk:PageOrientation>

..................

<psk:PageOutputColor psf2:psftype="Feature">
    <psk:Color psf2:psftype="Option" psf2:default="true">
      <psk:DeviceBitsPerPixel xsi:type="xsd:integer" psf2:psftype="ScoredProperty">24</psk:DeviceBitsPerPixel>
      <psk:DriverBitsPerPixel xsi:type="xsd:integer" psf2:psftype="ScoredProperty">24</psk:DriverBitsPerPixel>
    </psk:Color>
  </psk:PageOutputColor>
</PrintDeviceCapabilities>
```

FIG.6B-1

```xml
<?xml version="1.0" encoding="UTF-8"?>
<PrintDeviceCapabilities
  xmlns:ns0000="http://schemas.microsoft.com/windows/2018/04/printing/printschemakeywords/ipp"
  xmlns:xsi="http://www.w3.org/2001/XMLSchema-instance"
  xmlns:xsd="http://www.w3.org/2001/XMLSchema"
  xmlns:xml="http://www.w3.org/XML/1998/namespace"
  xmlns:psk="http://schemas.microsoft.com/windows/2003/08/printing/printschemakeywords"
  xmlns:psk11="http://schemas.microsoft.com/windows/2013/05/printing/printschemakeywordsv11"
  xmlns:psk12="http://schemas.microsoft.com/windows/2013/12/printing/printschemakeywordsv12"
  xmlns:psf="http://schemas.microsoft.com/windows/2003/08/printing/printschemaframework"
  xmlns:psf2="http://schemas.microsoft.com/windows/2013/12/printing/printschemaframework2"
  xmlns="http://schemas.microsoft.com/windows/2013/12/printing/printschemaframework2"
  version="2">

<!--copies-default, copies-supported -->
  <psk:JobCopiesAllDocuments psf2:psftype="ParameterDef">
    <psf:DataType psf2:psftype="Property" xsi:type="xsd:QName">xsd:integer</psf:DataType>
    <psf:DefaultValue psf2:psftype="Property" xsi:type="xsd:integer">1</psf:DefaultValue>
    <psf:Mandatory psf2:psftype="Property" xsi:type="xsd:QName">psk:Unconditional</psf:Mandatory>
    <psf:MinValue psf2:psftype="Property" xsi:type="xsd:integer">1</psf:MinValue>
    <psf:MaxValue psf2:psftype="Property" xsi:type="xsd:integer">99</psf:MaxValue>
    <psf:Multiple psf2:psftype="Property" xsi:type="xsd:integer">1</psf:Multiple>
    <psf:UnitType psf2:psftype="Property" xsi:type="xsd:string">copies</psf:UnitType>
  </psk:JobCopiesAllDocuments>

<!--media-default, media-supported, media-col-database -->
  <psk:PageMediaSize psf2:psftype="Feature">
    <psk:JapanHagakiPostcard psf2:psftype="Option" psf2:default="false">
      <psk:MediaSizeWidth xsi:type="xsd:integer" psf2:psftype="ScoredProperty">100000</psk:MediaSizeWidth>
      <psk:MediaSizeHeight xsi:type="xsd:integer" psf2:psftype="ScoredProperty">148000</psk:MediaSizeHeight>
      <psk12:PortraitImageableSize xsi:type="psf2:ImageableAreaType" psf2:psftype="Property">3400,5000,93200,138000</psk12:PortraitImageableSize>
      <psk12:BorderlessImageableSize xsi:type="psf2:ImageableAreaType" psf2:psftype="Property">0,0,100000,148000</psk12:BorderlessImageableSize>
    </psk:JapanHagakiPostcard>
    <psk:ISOA5 psf2:psftype="Option" psf2:default="false">
      <psk:MediaSizeWidth xsi:type="xsd:integer" psf2:psftype="ScoredProperty">148000</psk:MediaSizeWidth>
      <psk:MediaSizeHeight xsi:type="xsd:integer" psf2:psftype="ScoredProperty">210000</psk:MediaSizeHeight>
      <psk12:PortraitImageableSize xsi:type="psf2:ImageableAreaType" psf2:psftype="Property">3400,5000,141200,200000</psk12:PortraitImageableSize>
      <psk12:BorderlessImageableSize xsi:type="psf2:ImageableAreaType" psf2:psftype="Property">0,0,148000,210000</psk12:BorderlessImageableSize>
    </psk:ISOA5>
    <psk:ISOA4 psf2:psftype="Option" psf2:default="false">
      <psk:MediaSizeWidth xsi:type="xsd:integer" psf2:psftype="ScoredProperty">210000</psk:MediaSizeWidth>
      <psk:MediaSizeHeight xsi:type="xsd:integer" psf2:psftype="ScoredProperty">297000</psk:MediaSizeHeight>
      <psk12:PortraitImageableSize xsi:type="psf2:ImageableAreaType" psf2:psftype="Property">3400,5000,203200,287000</psk12:PortraitImageableSize>
      <psk12:BorderlessImageableSize xsi:type="psf2:ImageableAreaType" psf2:psftype="Property">0,0,210000,297000</psk12:BorderlessImageableSize>
    </psk:ISOA4>
    <psk:NorthAmericaLetter psf2:psftype="Option" psf2:default="true">
      <psk:MediaSizeWidth xsi:type="xsd:integer" psf2:psftype="ScoredProperty">215900</psk:MediaSizeWidth>
      <psk:MediaSizeHeight xsi:type="xsd:integer" psf2:psftype="ScoredProperty">279400</psk:MediaSizeHeight>
      <psk12:PortraitImageableSize xsi:type="psf2:ImageableAreaType" psf2:psftype="Property">6400,5000,203200,269400</psk12:PortraitImageableSize>
      <psk12:BorderlessImageableSize xsi:type="psf2:ImageableAreaType" psf2:psftype="Property">0,0,215900,279400</psk12:BorderlessImageableSize>
    </psk:NorthAmericaLetter>
    <psk:JapanYou4Envelope psf2:psftype="Option" psf2:default="false">
      <psk:MediaSizeWidth xsi:type="xsd:integer" psf2:psftype="ScoredProperty">105000</psk:MediaSizeWidth>
```

```xml
        <psk:MediaSizeHeight xsi:type="xsd:integer" psf2:psftype="ScoredProperty">235000</psk:MediaSizeHeight>
        <psk12:PortraitImageableSize xsi:type="psf2:ImageableAreaType" psf2:psftype="Property">5600,8000,93800,214300</psk12:PortraitImageableSize>
        <psk12:BorderlessImageableSize xsi:type="psf2:ImageableAreaType" psf2:psftype="Property">0,0,105000,235000</psk12:BorderlessImageableSize>
    </psk:JapanYou4Envelope>
    <psk:NorthAmericaLegal psf2:psftype="Option" psf2:default="false">
        <psk:MediaSizeWidth xsi:type="xsd:integer" psf2:psftype="ScoredProperty">215900</psk:MediaSizeWidth>
        <psk:MediaSizeHeight xsi:type="xsd:integer" psf2:psftype="ScoredProperty">355600</psk:MediaSizeHeight>
        <psk12:PortraitImageableSize xsi:type="psf2:ImageableAreaType" psf2:psftype="Property">6400,5000,203200,345600</psk12:PortraitImageableSize>
        <psk12:BorderlessImageableSize xsi:type="psf2:ImageableAreaType" psf2:psftype="Property">0,0,215900,355600</psk12:BorderlessImageableSize>
    </psk:NorthAmericaLegal>
    <psk:JISB5 psf2:psftype="Option" psf2:default="false">
        <psk:MediaSizeWidth xsi:type="xsd:integer" psf2:psftype="ScoredProperty">182000</psk:MediaSizeWidth>
        <psk:MediaSizeHeight xsi:type="xsd:integer" psf2:psftype="ScoredProperty">257000</psk:MediaSizeHeight>
        <psk12:PortraitImageableSize xsi:type="psf2:ImageableAreaType" psf2:psftype="Property">3400,5000,175200,247000</psk12:PortraitImageableSize>
        <psk12:BorderlessImageableSize xsi:type="psf2:ImageableAreaType" psf2:psftype="Property">0,0,182000,257000</psk12:BorderlessImageableSize>
    </psk:JISB5>
</psk:PageMediaSize>

<!--orientation-requested-default -->
<psk:PageOrientation psf2:psftype="Feature">
    <psk:Portrait psf2:psftype="Option" psf2:default="true"/>
    <psk:Landscape psf2:psftype="Option" psf2:default="false"/>
    <psk:ReverseLandscape psf2:psftype="Option" psf2:default="false"/>
</psk:PageOrientation>

<!--finishings-default, finishings-supported -->
<psk:JobStapleAllDocuments psf2:psftype="Feature">
    <psk:None psf2:psftype="Option" psf2:default="true"/>
    <psk:StapleTopLeft psf2:psftype="Option" psf2:default="false"/>
    <psk:StapleTopRight psf2:psftype="Option" psf2:default="false"/>
    <psk:StapleBottomLeft psf2:psftype="Option" psf2:default="false"/>
    <psk:StapleBottomRight psf2:psftype="Option" psf2:default="false"/>
    <psk:StapleDualLeft psf2:psftype="Option" psf2:default="false"/>
    <psk:StapleDualTop psf2:psftype="Option" psf2:default="false"/>
    <psk:StapleDualRight psf2:psftype="Option" psf2:default="false"/>
    <psk:StapleDualBottom psf2:psftype="Option" psf2:default="false"/>
    <psk:SaddleStitch psf2:psftype="Option" psf2:default="false"/>
</psk:JobStapleAllDocuments>

<!--sides-default, sides-supported -->
<psk:JobDuplexAllDocumentsContiguously psf2:psftype="Feature">
<psk:OneSided psf2:psftype="Option" psf2:default="true"/>
<psk:TwoSidedShortEdge psf2:psftype="Option" psf2:default="false"/>
<psk:TwoSidedLongEdge psf2:psftype="Option" psf2:default="false"/>
</psk:JobDuplexAllDocumentsContiguously>

<!--print-color-mode-default, print-color-mode-supported, pwg-raster-document-type-supported -->
    <psk:PageOutputColor psf2:psftype="Feature">
        <psk:Color psf2:psftype="Option" psf2:default="true"/>
        <psk:Grayscale psf2:psftype="Option" psf2:default="false"/>
        <psk:Monochrome psf2:psftype="Option" psf2:default="false"/>
    </psk:PageOutputColor>
</PrintDeviceCapabilities>
```

FIG.7

```
[Version]
Signature = "$WIN NT$"
Class = Extension
ClassGuid = {e2f84ce7-8efa-411c-aa69-97454ca4cb57}
Provider = %ManufacturerName%
ExtensionId = {D4D9196A-105B-4B76-B693-84BD33A7A703}
CatalogFile = App.cat
DriverVer = 08/19/2020,16.35.13.542

[Manufacturer]
%ManufacturerName% = Ms, NTamd64.6.3

[Microsoft.NTamd64.6.3]
%Device.ExtensionDesc% = App-Install, %PrinterHardwareId%%
Device.ExtensionDesc% = App-Install, %PrinterHardwareId2%%
Device.ExtensionDesc% = App-Install, %PrinterHardwareId3%[

App-Install.NT]
AddProperty = Add-App-Property

[App-Install.NT.Software]
AddSoftware = %SoftwareName%,, Ms-App-SoftwareInstall

[Microsoft-App-SoftwareInstall]
SoftwareType = %MsStoreType%
SoftwareID = pfn://%PackageFamilyName%

[Add-App-Property]
{A925764B-88E0-426D-AFC5-B39768BE59EB}, 1, 0x12,, %AUMID%

[Strings]
ManufacturerName = "Ms"
SoftwareName = "CPrintApp"
PackageFamilyName = "PrinterApp_aaaaaaaaaaa8a"
AUMID = "PrinterApp_aaaaaaaaaaa8a!App"
Device.ExtensionDesc = "PrintApp"
MsStoreType = 2
PrinterHardwareId = "PrinterApp_device001"
```

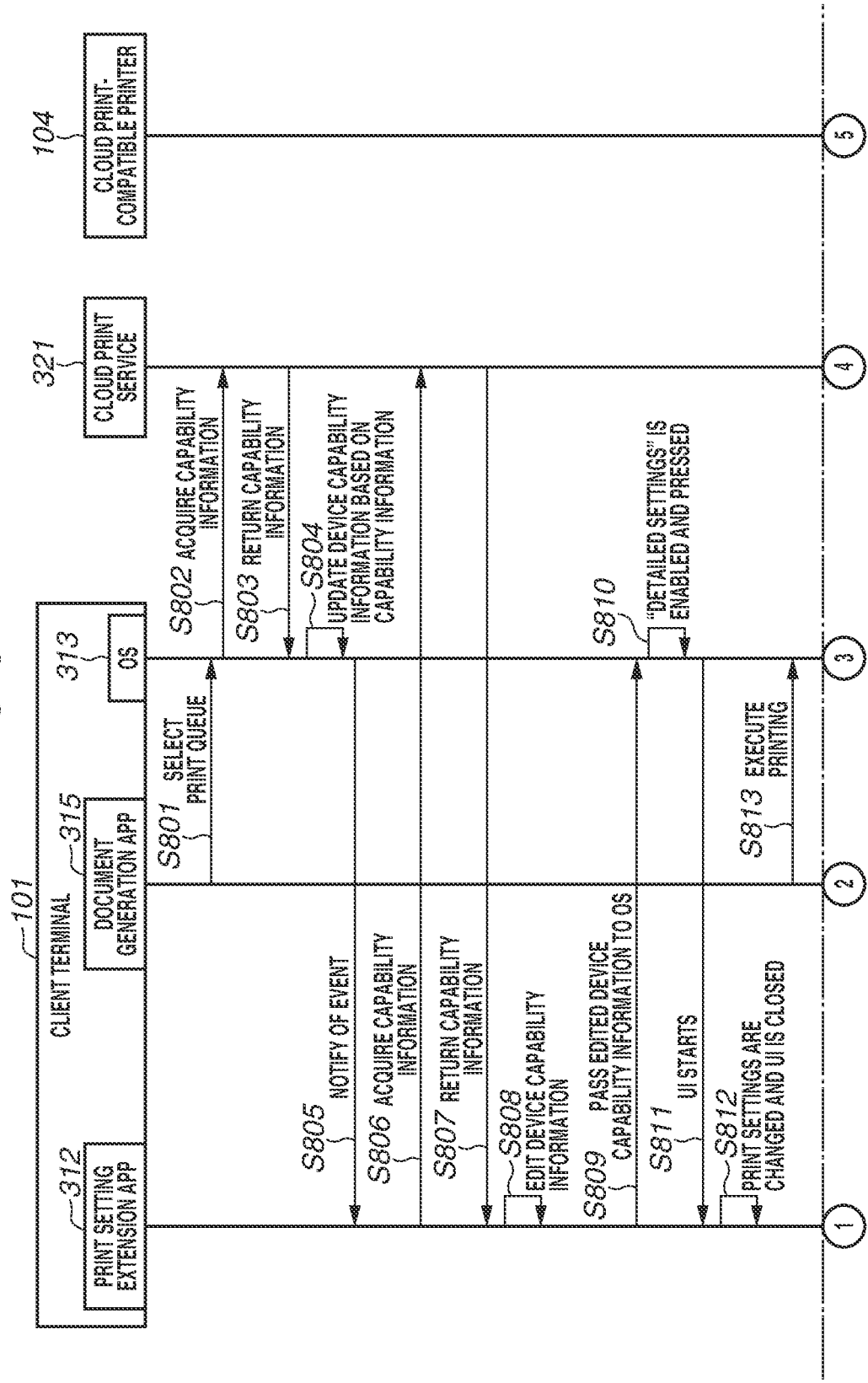

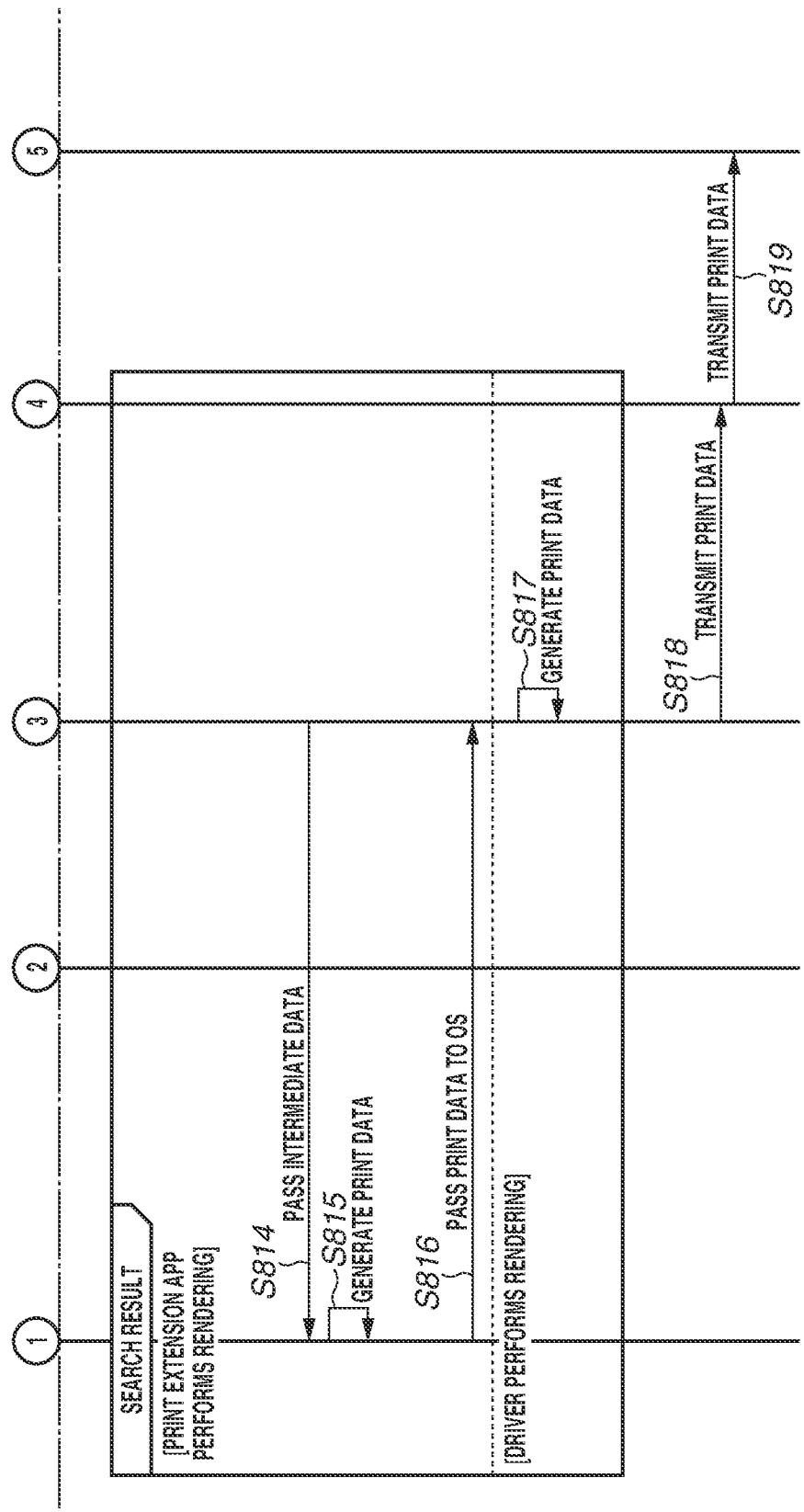

FIG.9A

Orientation of Printing
[Portrait ▼]

Two-Sided Printing
[Absent ▼]

Order Of Pages
[Forward ▼]

Print Quality
[Standard ▼]

[Advanced Settings] — 901

[OK] [Cancel] [Apply]
 905    904     903

FIG.9B

Sheet Size
[A4 ▼]

Number of Copies
[1 Copy]

Color Print Mode
[Color ▼]

Sheet Type
[Standard ▼]

[OK] [Cancel]
   902

FIG.9C

Marginless Printing
[Absent ▼]

Resolution
[300 dpi ▼]

Scaling
[Absent ▼]

Stapling
[Absent ▼]

[OK] [Cancel]

FIG.9D

Folding setting
[Absent ▼]

Punching
[Absent ▼]

Sheet Discharge Port
[Automatic ▼]

Nup
[2 ▼]

[OK] [Cancel]

FIG.10A

Output Sheet Size — 1001
A4 ▼

Type of Sheet
Plain Paper

Number of Copies
1

Orientation of Sheet
● Portrait ○ Landscape

Print Quality
Standard ▼

1002 — OK | Cancel

FIG.10B

Print in Units of Copies
OFF ▼

Stapling
Top Left ▼

Punching
Absent ▼

Folding setting
Absent ▼

Color Mode
Color ▼

OK | Cancel

FIG.10C

Page Aggregate
2in1 ▼

Placement Order
Left to Right ▼

Magnification
Absent ▼

Two-Sided Printing
One-Sided ▼

Binding Direction
Long-Side Binding ▼

OK | Cancel

FIG.10D

180-Degree Rotation
Absent ▼

Save Job in Printer
OFF ▼

Shorten Job Name
OFF ▼

OK | Cancel

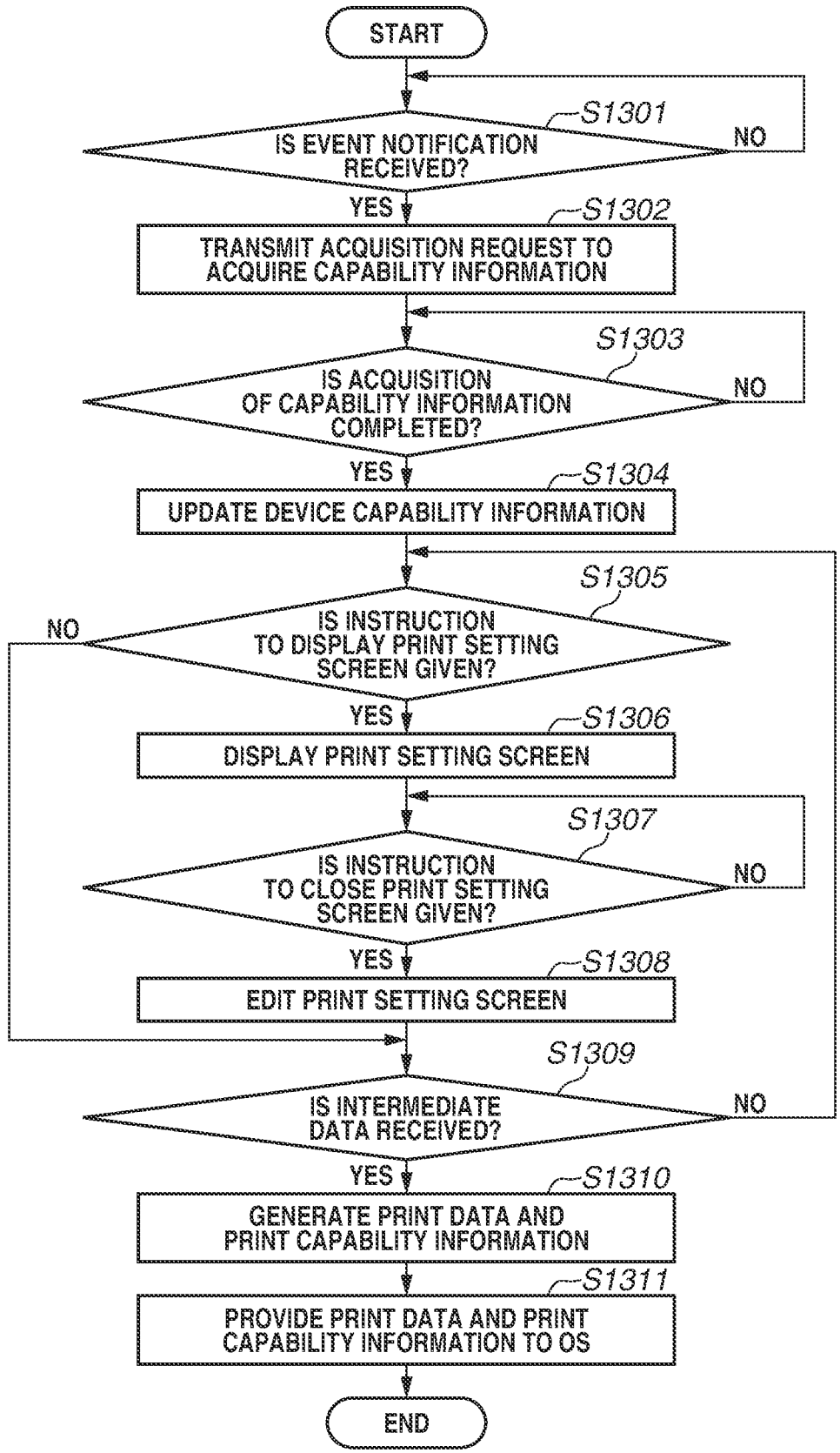

INFORMATION PROCESSING APPARATUS, CONTROL METHOD FOR CONTROLLING INFORMATION PROCESSING APPARATUS, AND STORAGE MEDIUM FOR DISPLAYING A PRINT SETTING SCREEN

BACKGROUND

Field of the Disclosure

The present disclosure relates to an information processing apparatus, a control method for controlling an information processing apparatus, and a storage medium.

Description of the Related Art

In recent years, a general-purpose printer driver using an industry standard protocol such as the Internet Printing Protocol (IPP) is considered. Examples of the general-purpose printer driver include a local printer driver that directly connects to a printer, and a cloud printer driver that transmits print data to a cloud print service.

The general-purpose printer driver can communicate with printers of a plurality of printer vendors. Thus, using the general-purpose printer driver, a user can transmit print data to an image forming apparatus or a cloud print service without installing a printer driver specific to a vendor.

Since the above general-purpose printer driver handles a print job to be printed by printers of various vendors, items and functions that can be set as print settings for the general-purpose printer driver are limited. Accordingly, as in the publication of Japanese Patent Application Laid-Open No. 2021-124791, a technique for using identification information of a printer associated with a printer driver and extending a print queue associated with the printer driver is considered. Consequently, it is possible to achieve a print setting user interface (UI) and a print job editing function unique to a vendor.

SUMMARY

To extend a print queue associated with the general-purpose printer driver and display a print setting screen where setting items unique to a vendor can be set, it is necessary to acquire capability information regarding the setting items unique to the vendor before the print setting screen is displayed.

According to embodiments of the present disclosure, an information processing apparatus that stores a printer driver configured to generate image data to be transmitted according to a predetermined protocol includes a selection unit configured to select printer information regarding a single printer from stored printer information regarding a plurality of printers, a notification unit configured to give a notification to an application corresponding to the printer information selected by the selection unit, an acquisition unit configured to, based on an instruction given by the application having received the notification, acquire first capability information that is defined by a predetermined protocol and second capability information that is not defined by the predetermined protocol from a cloud print service, and a display unit configured to, based on the second capability information acquired by the acquisition unit, display an object that receives a print setting.

Further features of the present disclosure will become apparent from the following description of exemplary embodiments with reference to the attached drawings.

BRIEF DESCRIPTION OF THE DRAWINGS

FIG. 1 is a diagram illustrating an example of a printing system according to the present exemplary embodiment.

FIGS. 3A and 3B are diagrams illustrating an example of a sequence illustrating a process for installing a print setting extension app according to the present exemplary embodiment.

FIG. 5 is a diagram illustrating an example of configuration information stored in a cloud print-compatible printer according to the present exemplary embodiment.

FIG. 6A is a diagram illustrating an example of device configuration information supplied with an operating system (OS) according to the present exemplary embodiment.

FIGS. 6B-1 and 6B-2 are diagrams illustrating an example of the device configuration information extended using information acquired from a cloud print service according to the present exemplary embodiment.

FIG. 7 is a diagram illustrating an example of an extension setup information file acquired from an online support service according to the present exemplary embodiment.

FIGS. 8A and 8B are diagrams illustrating an example of a sequence illustrating processing from when print settings are made using the print setting extension app and print data is transmitted in the present exemplary embodiment.

FIGS. 9A to 9D are diagrams illustrating examples of print setting screens displayed in a case where the print setting extension app is not installed according to the present exemplary embodiment.

FIGS. 10A to 10E are diagrams illustrating examples of a print setting screen displayed in a case where the print setting extension app is installed according to the present exemplary embodiment.

FIG. 13 is a flowchart illustrating processing when print settings are made using the print setting extension app and print data is generated according to the present exemplary embodiment.

DESCRIPTION OF THE EMBODIMENTS

Figure 2A:
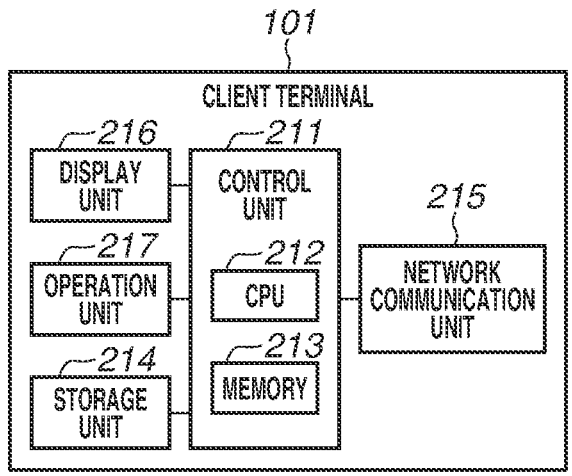
FIGS. 2A to 2E are diagrams illustrating examples of hardware configurations of information processing apparatuses and an image forming apparatus according to the present exemplary embodiment.

Exemplary embodiments of the present disclosure will be described below with reference to the drawings.

FIG. 1 is a diagram illustrating the configuration of a printing system in cloud printing according to the present exemplary embodiment. A client terminal 101, a cloud print server 102, an application management server 103, a cloud print-compatible printer 104, and an online support server 105 are connected together via a network 107.

Although FIG. 1 illustrates a single client terminal 101 and a single cloud print-compatible printer 104, a plurality of client terminals 101 and a plurality of cloud print-compatible printers 104 may be present.

Each of the cloud print server 102, the application management server 103, and the online support server 105 may be a server system including a plurality of information processing apparatuses. Each server may be a server system including a plurality of information processing apparatuses, whereby it is possible to distribute load to the plurality of information processing apparatuses.

The cloud print server 102, the application management server 103, and the online support server 105 may be virtually configured within a physically single information processing apparatus.

Although it is assumed that the network 107 is a wide area network (WAN) such as the Internet for connection to a cloud service, the entirety of the network 107 may be a closed environment such as a company local area network (LAN).

The client terminal 101 is an information processing apparatus such as a personal computer (PC), a tablet, or a smartphone and is a terminal directly operated by a user. Arbitrary application software can be executed on the client terminal 101.

The cloud print-compatible printer 104 is a device that actually performs printing on a recording medium such as a sheet, and is an image forming apparatus that converts print data received via the network 107 into image data and prints the image data.

The cloud print-compatible printer 104 can both receive print data from the client terminal 101 via the cloud print server 102 and receive print data from the client terminal 101 not via the cloud print server 102.

The cloud print-compatible printer 104 receives print data generated by a cloud printer driver 311 of the client terminal 101 via the cloud print server 102. The cloud print-compatible printer 104 also receives print data generated by a local printer driver 314 of the client terminal 101 not via the cloud print server 102.

The cloud print server 102 receives a print instruction and print data from outside. Then, the cloud print server 102 transmits the received print data to the predetermined cloud print-compatible printer 104.

The application management server 103 holds and manages various applications.

The application management server 103 receives identification information of an application and a download request to download the application from the client terminal 101 and transmits the application identified based on the received identification information to the client terminal 101.

The online support server 105 is a server apparatus that provides an online support service 351. The online support service 351 is a server apparatus that provides the client terminal 101 with an extension setup information file describing information for extending a function of the client terminal 101.

Next, with reference to FIGS. 2A to 2E, hardware configurations in the system according to the present exemplary embodiment will be described.

FIG. 2A is a block diagram illustrating the hardware configuration of the client terminal 101.

The client terminal 101 includes a display unit 216, an operation unit 217, a storage unit 214, a control unit 211, and a network communication unit 215.

The storage unit 214 refers to a non-volatile storage device such as a hard disk or a solid-state drive (SSD) and can save and rewrite digital data.

The control unit 211 includes a central processing unit (CPU) 212 and a memory 213 and controls the operation of the entirety of the client terminal 101. The CPU 212 loads a program stored in the storage unit 214 into the memory 213 and executes the program. The memory 213 is a main storage memory of the CPU 212 and is used as a work area or a temporary storage area into which various programs are loaded.

The network communication unit 215 is a device that communicates with the external network 107, and inputs and outputs digital data to and from an external server or the client terminal 101 via the network 107.

The display unit 216 is a device that displays visual information to the user, such as a liquid crystal display. The operation unit 217 is a device that receives an input from the user through a keyboard and a mouse. A device having the functions of both the display unit 216 and the operation unit 217, such as a touch panel, may be used.

Figure 2B:
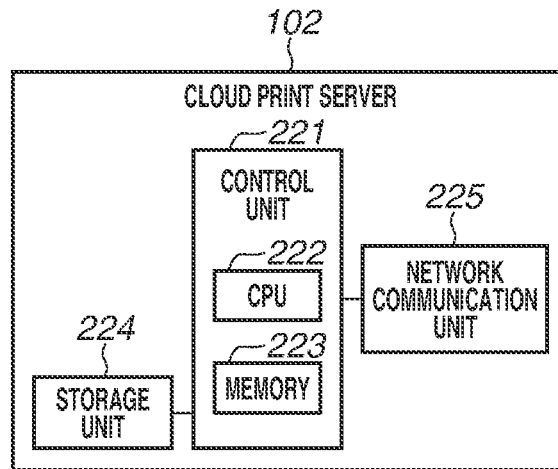

FIG. 2B is a block diagram illustrating the hardware configuration of the cloud print server 102. The cloud print server 102 includes a storage unit 224, a control unit 221, and a network communication unit 225.

The descriptions of the storage unit 224, the control unit 221, and the network communication unit 225 are equivalent to those of the client terminal 101 and therefore are omitted.

Although the description is given on the assumption that the cloud print server 102 includes a single information processing apparatus having the hardware configuration illustrated in FIG. 2B, the cloud print server 102 may include a plurality of information processing apparatuses as illustrated in FIG. 2B.

Figure 2C:
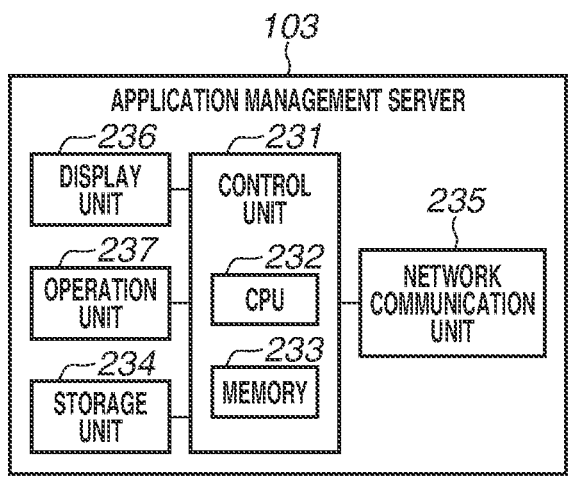

FIG. 2C is a block diagram illustrating the hardware configuration of the application management server 103. The application management server 103 includes a display unit 236, an operation unit 237, a storage unit 234, a control unit 231, and a network communication unit 235.

The descriptions of the display unit 236, the operation unit 237, the storage unit 234, the control unit 231, and the network communication unit 235 are equivalent to those of the client terminal 101 and therefore are omitted.

Although the description is given on the assumption that the application management server 103 includes a single information processing apparatus having the hardware configuration illustrated in FIG. 2C, the application management server 103 may include a plurality of information processing apparatuses.

Figure 2D:
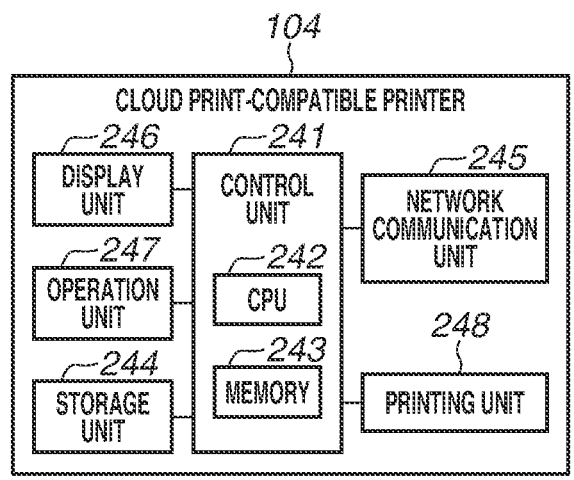

FIG. 2D is a block diagram illustrating the hardware configuration of the cloud print-compatible printer 104. The cloud print-compatible printer 104 includes a display unit 246, an operation unit 247, a storage unit 244, a control unit 241, a network communication unit 245, and a printing unit 248.

The display unit 246 is a device that displays information to the user, such as a touch panel or a light-emitting diode (LED) provided in the cloud print-compatible printer 104.

The operation unit 247 is a device that receives an input from the user, and may include a hardware key such as a numeric keypad in addition to a touch panel. The storage unit 244 and the control unit 241 are equivalent to those of the client terminal 101, and therefore are not described.

The network communication unit 245 is a device that communicates with the external network 107, and has the function of mainly receiving print data and transmitting the state of the cloud print-compatible printer 104, such as an error, to an external server.

The printing unit 248 is a device that performs a print process on a sheet prepared in a cassette or a tray by performing a series of operations such as sheet feeding, printing, and sheet discharge. The method of the printing is not particularly limited, and may be an electrophotographic method or an inkjet method. The printing unit 248 also includes a two-sided unit used when the sheet discharge is performed, and a finishing device that performs stapling and punching processes.

Although a single-function printer that performs only a print function is described as an example of the cloud print-compatible printer 104 in the present exemplary embodiment, a multifunction printer (a multifunction peripheral) also having a scanner function and a fax function may be used.

Figure 2E:
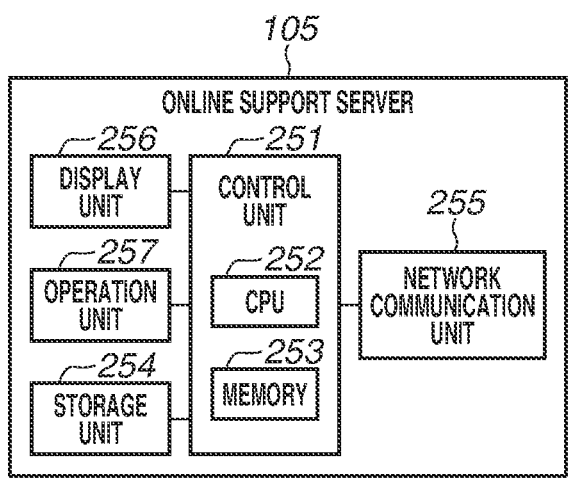

FIG. 2E is a hardware block diagram illustrating the details of the online support server 105. Although the description is given on the assumption that the online support server 105 includes a single information processing apparatus in the present exemplary embodiment, the online support server 105 may include a plurality of information processing apparatuses. The online support server 105 includes a display unit 256, an operation unit 257, a storage unit 254, a control unit 251, and a network communication unit 255. The display unit 256 and the operation unit 257 are similar to the display unit 216 and the operation unit 217, respectively, of the client terminal 101, and therefore are not described. The storage unit 254 is a memory device such as a hard disk drive (HDD) or an SSD. The storage unit 254 stores an extension setup information file that is a file describing information for extending a function provided by the client terminal 101.

The control unit 251 includes a CPU 252 and a memory 253. The CPU 252 controls the entirety of the online support server 105. The memory 253 is used in processing executed by the CPU 252. The network communication unit 255 is an interface for the online support server 105 to communicate with the client terminal 101. The online support server 105 receives an acquisition request to acquire a file stored in the storage unit 254 and transmits the corresponding file to the client terminal 101 via the network communication unit 255.

Next, with reference to FIG. 3, a description will be given of examples of the procedure of the user and the sequence between pieces of software and a print service according to the present exemplary embodiment.

First, in step S3001, the cloud print-compatible printer 104 receives from the user a printer registration operation for registering the cloud print-compatible printer 104 in a cloud print service 321. The cloud print-compatible printer 104 transmits a printer registration request together with device identification information of the printer 104 to the cloud print service 321. The device identification information transmitted to the cloud print service 321 at this time is, for example, a hardware identification (ID) (HWID) assigned to each printer model. The device identification information may be any information so long as the information can identify the model of the printer 104.

If the cloud print service 321 receives the registration request, the cloud print service 321 transmits a Uniform Resource Locator (URL) of the cloud print service 321 for printer registration to the cloud print-compatible printer 104. If the user accesses the URL from the cloud print-compatible printer 104 or an information processing apparatus, a display unit of the terminal from which the user accesses the URL displays an input screen for inputting a user ID and a password. The user inputs a user ID and a password for using the cloud print service 321 and logs into the cloud print service 321. If the login of the user is successful, the cloud print service 321 transmits an acquisition request to acquire information required for printer registration to the cloud print-compatible printer 104. The cloud print-compatible printer 104 transmits printer information to the cloud print service 321 in response to the request.

Next, the cloud print service 321 having received the printer registration request registers the information regarding the cloud print-compatible printer 104 and generates a print queue for the cloud print-compatible printer 104. At this time, the cloud print service 321 acquires capability information regarding the cloud print-compatible printer 104 and associates the capability information with the generated print queue. The capability information is information indicating functions included in the printer 104 and refers to information necessary for the user to make print settings when printing is performed, such as two-sided capability information, color capability information, and stapling capability information.

FIG. 5 is a diagram illustrating an example of the capability information. The capability information includes an item name and an attribute value. The item name corresponds to a setting item of a print setting. The attribute value corresponds to a setting value, an option, or a value range that can be set for each setting item. In addition to item names and attribute values defined as industry standard specifications by the Internet Printing Protocol (IPP), the cloud print-compatible printer 104 also stores item names and attribute values uniquely defined by a printer vendor. For example, among the item names illustrated in FIG. 5, "save job in printer", "shorten job name", and "stapleless binding" and attribute values associated with these item names are item names and attribute values uniquely defined by the printer vendor. "Save job in printer" is a setting item for setting whether print data received from the cloud print service 321 by the printer 104 is to be saved in the printer 104 also after the print data is printed. "Shorten job name" is an item for setting whether, when bibliographic information regarding print data received from the cloud print service 321 by the printer 104 is displayed on the display unit 246 of the printer 104, a name given to the print data is to be displayed by shortening the name. "Stapleless binding" is an item for setting whether output sheets based on print data received from the cloud print service 321 by the printer 104 are to be bound without using a staple. Binding without using a staple means, for example, binding the sheets by pressure bonding. As an attribute value corresponding to an item name defined as an industry standard specification, an attribute value unique to the printer vendor may be defined. For example, "folding setting" is an item name defined by the IPP. On the other hand, "saddle fold", which is one of the attribute values of "folding setting", is the function of collectively folding one or more sheets and discharging the sheets without binding the sheets with a staple and is an attribute value uniquely defined by the printer vendor.

In the present exemplary embodiment, the capability information is transmitted to the cloud print service 321 according to the IPP as a communication protocol. The cloud print-compatible printer 104 registers the capability information using a command prepared for the cloud print-compatible printer 104 to register the capability information in the cloud print service 321. The cloud print-compatible printer 104 notifies the cloud print service 321 of the item names illustrated in FIG. 5 and attribute values and default values corresponding to the respective item names. The capability information of which the cloud print service 321 is notified at this time does not depend on whether the items and the attribute values are defined by the IPP. For example, the cloud print service 321 is also notified of the item names and the attribute values of "save job in printer", "shorten job name", and "stapleless binding" illustrated in FIG. 5. "Saddle fold", which is one of the attribute values of "folding setting" and is an attribute value unique to the printer vendor, is also registered as one of the attribute values of "folding setting" in the cloud print service 321.

Next, a description will be given of the installation of a print setting extension app 312 performed in a case where the user performs on the client terminal 101 a setup operation for performing printing by the cloud print-compatible printer 104. When the cloud print-compatible printer 104 is registered in the client terminal 101, a standard print function, which is one of functions included in an operating system (OS) 313 of the client terminal 101, is used.

Figure 4:
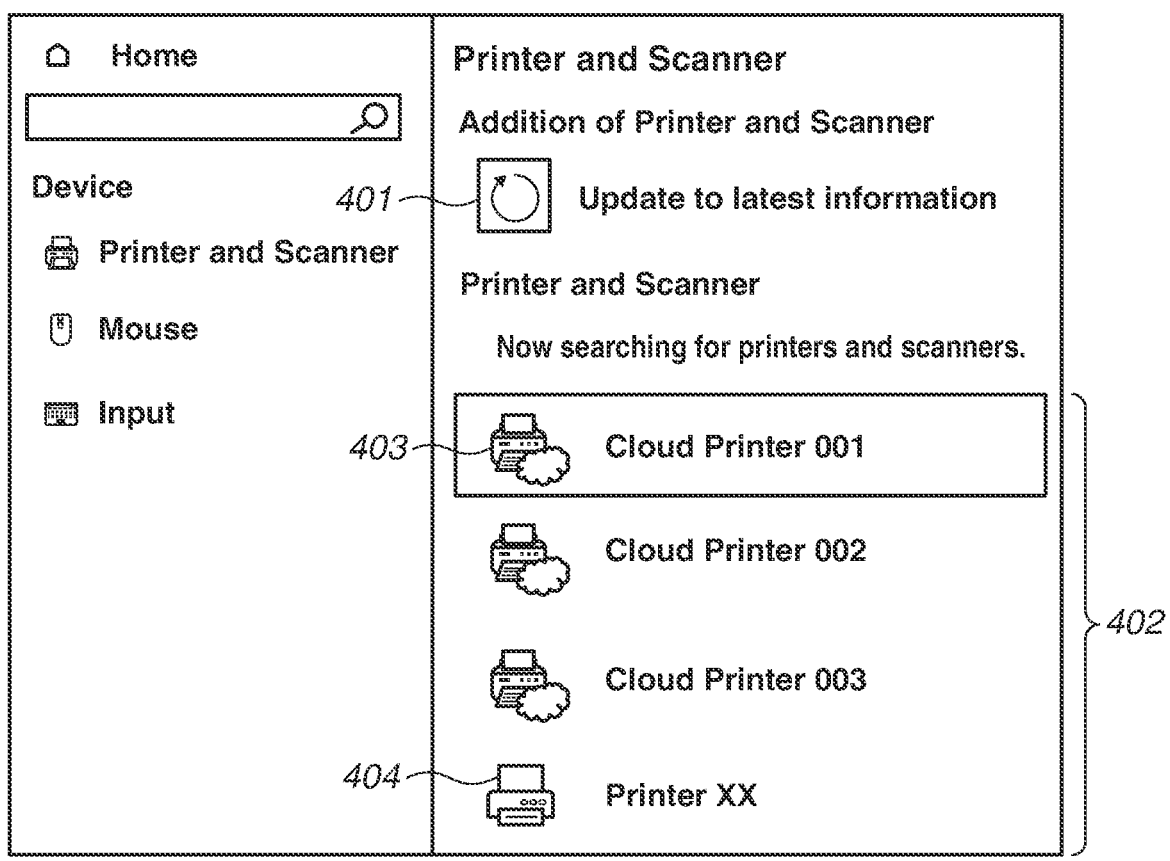
FIG. 4 is a diagram illustrating an example of a screen displayed on a client terminal according to the present exemplary embodiment.

In step S3002, the OS 313 of the client terminal 101 receives a printer addition operation as a setup operation for the cloud print-compatible printer 104 performed by the user. The setup operation for the cloud print-compatible printer 104 is, for example, the following operation. FIG. 4 illustrates a screen displayed by the OS 313 of the client terminal 101 and regarding printers registered in the client terminal 101. The user selects an object 401, whereby a printer search instruction is input to the OS 313.

The OS 313 having received the printer search instruction determines whether the OS 313 holds a token for the cloud print service 321. If the OS 313 does not hold the token, the OS 313 displays a screen for inputting user information (a login name and a password) (not illustrated). In step S3003, the OS 313 of the client terminal 101 transmits user information input via the screen to the cloud print service 321 and requests user authentication and the access token.

In step S3004, the cloud print service 321 performs an authentication process using the user information received from the client terminal 101. If the authentication process is completed, the cloud print service 321 notifies the client terminal 101 of the result of the authentication process.

If the user authentication is successful, then in step S3005, the OS 313 of the client terminal 101 acquires the access token from the cloud print service 321.

If the user authentication fails in step S3004, then in step S3006, the cloud print service 321 notifies the OS 313 of the client terminal 101 of an authentication error. In step S3007, based on the received information regarding the authentication error, the OS 313 of the client terminal 101 stops the processing. If the acquisition of the access token fails, the OS 313 of the client terminal 101 ends the processing illustrated in FIG. 3.

If the OS 313 holds the access token, or if the OS 313 acquires the token in step S3005, the processing proceeds to step S3008. The OS 313 searches for printers registered in the cloud print service 321 and a printer connected to the network 107.

In step S3008, the OS 313 of the client terminal 101 transmits an acquisition request to acquire printer information regarding printers registered in the cloud print service 321 and searches for printers. In step S3008, the OS 313 of the client terminal 101 transmits the acquisition request to acquire the printer information to which the access token is attached to the cloud print service 321.

In step S3009, the cloud print service 321 transmits information regarding printers that the user identified by the access token attached to the acquisition request is permitted to use to the client terminal 101. The printer information transmitted to the client terminal 101 in step S3009 is printer names given to printers registered in the cloud print service 321 and the HWIDs of the printers.

The OS 313 of the client terminal 101 acquires a list of the printers transmitted from the cloud print service 321 and device identification information of each printer. In parallel with the processes of steps S3008 and S3009, the OS 313 of the client terminal 101 searches for a printer connected to the same network as the client terminal 101. This is a search for a device according to mDNS or Bonjour.

The OS 313 displays a list of printers on the client terminal 101 based on the printer information acquired from the cloud print service 321 and printer information detected by the search on the network 107. An area 402 in FIG. 4 displays the printer information received from the cloud print service 321 in a list. In information displayed in the area 402, "Cloud Printer 001", "Cloud Printer 002", and "Cloud Printer 003" are the information regarding the printers registered in the cloud print service 321. On the other hand, "Printer XX" indicates the printer detected by the client terminal 101 searching the network 107. As described above, information regarding printers acquired from the cloud print service 321 and information regarding a printer detected by searching the network 107 are displayed in a list. The printer information received from the cloud print service 321 is displayed by adding icons 403 to the printer information. On the other hand, the printer information detected by searching the network 107 is displayed by adding an icon 404 to the printer information. In this manner, the printer information received from the cloud print service 321 and the printer information detected by searching the network 107 can be displayed in a distinguished manner. The client terminal 101 may display only the information regarding the printers registered in the cloud print service 321.

Next, the user selects printer information corresponding to a printer that the user wishes to register in the client terminal 101 from the printer information displayed in the area 402.

In step S3010, the OS 313 of the client terminal 101 inquires of the cloud print service 321 about capability information regarding the printer corresponding to the selected printer information. Regarding which setting items the OS 313 of the client terminal 101 inquires about the capability information is determined by the specifications of the OS 313 and is set for the OS 313. The OS 313 of the client terminal 101 specifies the setting items stored in advance and inquiries about the capability information. The items set in advance for the OS 313 are setting items defined as standard specifications by the IPP, and for example, are items such as "sheet size", "type of sheet", and "color mode".

In step S3011, the cloud print service 321 returns the capability information regarding the cloud print-compatible printer 104 to the OS 313 of the client terminal 101.

In the present exemplary embodiment, the description will be given on the assumption that the information registered in the cloud print service 321 when the cloud print-compatible printer 104 is registered in step S3001 is transmitted to the client terminal 101 in step S3011. Alternatively, the capability information registered in the cloud print service 321 at a timing other than the above timing may be transmitted to the client terminal 101. For example, the capability information registered in the cloud print service 321 according to a change in the capability information regarding the cloud print-compatible printer 104 may be transmitted to the client terminal 101. Yet alternatively, the user may give an instruction to update the capability information on a user interface provided by the cloud print service 321, and the capability information updated according to the instruction may be transmitted to the client terminal 101. Yet alternatively, the cloud print service 321 may acquire the capability information from the cloud print-compatible printer 104 at the timing of step S3010 and notify the client terminal 101 of the acquired capability information.

In step S3011, regarding the setting items specified by the client terminal 101, the cloud print service 321 returns attribute values and default values corresponding to the setting items. The attribute values returned at this time are all attribute values registered in the cloud print service 321 regardless of whether the attribute values are attribute values defined as standard. The default values are values initially set when the client terminal 101 displays a print setting screen. If the cloud print service 321 does not store a response to the attributes about which the OS 313 of the client terminal 101 inquires, the cloud print service 321 does not respond to the OS 313.

Next, the OS 313 starts installing the cloud printer driver 311 based on the device identification information of the printer 104 selected by the user and the printer name of the printer 104.

Then, in step S3012, the OS 313 generates a print queue for the cloud printer driver 311 having basic device capability information supplied with the OS 313. The device capability information refers to definition information required to generate print setting capability information regarding a printer driver, such as information described in Extensible Markup Language (XML), e.g., "PrintDeviceCapabilites". FIG. 6A is a diagram illustrating an example of the device capability information in the initial state supplied with the OS 313. For example, "Feature" indicates that "PageMediaSize" representing the sheet size is a setting item. "Option" indicates an option corresponding to "PageMediaSize". In the initial values of the device capability information, as illustrated in FIG. 6A, there are only two options, namely "A4" and "Letter", for the sheet size. This information is stored in association with the print queue when the print queue is generated, and is managed by the OS 313. The device capability information in the initial state is fixed device capability information regardless of information regarding a printer connected to the client terminal 101.

Then, using the capability information acquired from the cloud print service 321, the OS 313 updates the device capability information for configuring the cloud printer driver 311. FIGS. 6B-1 and 6B-2 are diagrams illustrating an example of the device capability information updated using the capability information acquired from the cloud print service 321. For example, to "PageMediaSize" representing the sheet size, "Option" other than "A4" and "Letter" is added as the sheet size on which the cloud print-compatible printer 104 can perform printing. As described above, first, the client terminal 101 registers the cloud printer driver 311 and the device capability information supplied with the OS 313 in association with each other in the print queue. Then, the client terminal 101 updates the device capability information associated with the print queue using the capability information acquired from the cloud print service 321. At this time, the OS 313 updates the device capability information using only attribute values defined as industry standard specifications in the capability information acquired from the cloud print service 321. Thus, for example, even if an attribute value unique to the vendor is acquired as the sheet type in the acquisition of the capability information, the attribute value unique to the vendor is not added to the device capability information.

In this manner, it is possible to set print setting values that cannot be set in the device capability information supplied with the OS 313.

Based on the above, the installation of the cloud printer driver 311 is completed. The above processing is performed, whereby the client terminal 101 can transmit print data to the print queue for the cloud print-compatible printer 104 that is generated for the cloud print service 321.

Next, the OS 313 starts an installation process for installing an application for extending the cloud printer driver 311 in association with the printer 104.

First, the OS 313 performs an identification additional information giving process for giving identification additional information to the device identification information. This is a process required to acquire an extension setup information file 700 from the online support server 105, and the identification additional information only needs to be a character string different from that of the normal device identification information. In the present exemplary embodiment, to distinguish the application from an application of another device, the OS 313 gives identification additional information indicating an application corresponding to a printer ("PrinterApp_") to the device identification information. "PrinterApp_" is merely an example, and another character string, a number, or a sign may be used. As a result of the above process, for example, if the device identification information of the cloud print-compatible printer 104 is "device001", the device identification information subjected to the identification additional information giving process is "PrinterApp_device001".

In step S3013, the OS 313 transmits a search request to search for the extension setup information file 700, including the device identification information with the additional information as a target, to the online support service 351. By step S3013, the online support service 351 is notified of "PrinterApp_device001", which is given the identification additional information.

The online support service 351 stores an extension setup information file illustrated in FIG. 7. FIG. 7 illustrates an example of the extension setup information file 700. The extension setup information file 700 is a file created by the vendor of the cloud print-compatible printer 104 and registered in the online support service 351.

The extension setup information file 700 describes an application identifier for identifying a print setting extension app used to set print data to be sent to the cloud print-compatible printer 104. In the extension setup information file illustrated in FIG. 7, an item "PackageFamilyName" is identification information of the print setting extension application. On the other hand, "PrinterHardwareId" describes a character string obtained by adding the identification additional information to the identification information of the cloud print-compatible printer 104.

The online support service 351 stores extension setup information describing identification information of a printer driver in addition to extension setup information describing the identification information of the print setting extension application. In the extension setup information describing the identifier of the printer driver, "PackageFamilyName" describes the identifier of the printer driver. The extension setup information corresponding to "PrinterHardwareId" describes the device identification information without the identification additional information.

As described above, the online support service 351 stores both the extension setup information describing the identifier of the printer driver and the extension setup information describing the identifier of the print setting extension application. Thus, the identification additional information is added to the device identification information so that the OS 313 appropriately acquires necessary extension setup information.

The online support service 351 having received the search request identifies the extension setup information file 700 in which "PackageFamilyName" matches the device identification information with the identification additional information specified by the request.

As a result of the search, if the online support service 351 stores the extension setup information file 700 including the device identification information as the target, then in step S3014, the online support service 351 returns the extension setup information file 700 to the OS 313. At this time, the content of the extension setup information file 700 is written to the registry of the OS 313.

Next, in step S3015, the OS 313 installs extension setup information written in the extension setup information file 700 acquired from the online support service 351 in association with the print queue generated in step S3012.

Next, in step S3016, the OS 313 extracts an application ID from the installed extension setup information. The application ID is the identifier defined by "PackageFamilyName" in the extension setup information file 700. The above processing is processing in a case where the online support service 351 stores the extension setup information file 700 corresponding to the cloud print-compatible printer 104.

As a result of the search, there is a case where the extension setup information file 700 including the device identification information as the target is not detected in the online support service 351. At this time, in step S3017, the OS 313 completes the installation of the cloud printer driver 311 and stops the installation process for installing the application. If the extension setup information file 700 is not received within a predetermined time from the search request in step S3013, or if an error notification is received from the online support service 351, the OS 313 executes the process described in step S3017.

In step S3018 and subsequent steps, a description will be given of processing in a case where the extension setup information file 700 is acquired, and the application ID is extracted in step S3016.

In step S3018, the OS 313 requests an application management service 331 to search for an application that the extracted application ID matches. The application management service 331 stores an application that operates on the client terminal 101 and an application ID, which is the identifier of the application, in association with each other. The application and the application ID are registered in the application management service 331 by the vendor who provides the cloud print-compatible printer 104.

If the application management service 331 holds a print setting extension app that matches the requested application ID, then in step S3019, the application management service 331 returns the print setting extension app 312 to the client terminal 101. The print setting extension app 312 returned at this time is an application given the same ID as the transmitted application ID.

In step S3020, the OS 313 installs the acquired print setting extension app 312 in association with the print queue on the client side. The OS 313 saves the application ID as information regarding the print queue in the registry. The print setting extension app 312 is also set in the OS 313 so that the print queue associated with the application 312 gives an event notification to the OS 313 at a timing set on a print setting screen. The installed print setting extension app 312 is started after the client terminal 101 is powered on and the OS 313 starts. After the print setting extension app 312 is started, the print setting extension app 312 operates as a background task.

If the application management service 331 does not hold a print setting extension app that matches the requested application ID, then in step S3021, the OS 313 stops the installation process for installing the application. In this case, the generated print queue and the cloud printer driver 311 are installed in association with each other, the print setting extension app 312 is not associated with the print queue, and the processing ends.

In the above description, the extension setup information file 700 is searched for by adding a predetermined character string to the device identification information of the cloud print-compatible printer 104. A configuration may be employed in which, if a file for installing a printer driver can be distinguished, the extension setup information file 700 may be searched for without adding the predetermined character string.

Next, with reference to FIGS. 8A and 8B, a description will be given of examples of the procedure of the user and the sequence between pieces of software and the print service according to the present exemplary embodiment.

A document generation app 315 is an application such as an application for creating document data, an application for creating a presentation material, or an application for displaying a photograph or image data.

The document generation app 315 displays a print setting screen for selecting a print queue (FIG. 11) as a print setting initial screen. Although the document generation app 315 displays the print setting initial screen in the present exemplary embodiment, the OS 313 may display a similar screen. The print setting initial screen displays an object 1101 for selecting a print queue, an object 1102 for making various print settings, and a print preview image 1103.

In step S801, the OS 313 selects a print queue associated with a printer set as a default printer. In the present exemplary embodiment, the cloud print-compatible printer 104 is selected as the default printer. The processes of step S801 and subsequent steps are executed also in a case where the user changes a printer to be used by operating the object 1101.

Next, in step S802, the OS 313 inquires of the queue on a cloud corresponding to the cloud print-compatible printer 104 in the cloud print service 321 about the capability information regarding the cloud print-compatible printer 104. Regarding which setting items the OS 313 inquires about the capability information is determined in advance by the specifications of the OS 313. Thus, the capability information acquired at this timing is similar to that acquired in step S3001 in FIG. 3. This inquiry is made to the cloud print-compatible printer 104 using a command based on a standard protocol defined by the IPP, such as "Get-print-Attributes". In a case where "Get-print-Attributes" is used, the capability information determined by the OS 313 is inquired about in a list format.

In step S803, the cloud print service 321 returns to the OS 313 the capability information regarding the cloud print-compatible printer 104 from the list of capability information sent using "Get-print-Attributes". For example, suppose that an attribute "medium size" is specified by "Get-print-Attributes" (IPP). If the cloud print service 321 holds the attribute "medium size", the cloud print service 321 returns a value ("A4", "B5", or "Letter") associated with the attribute. If the attribute specified by "Get-print-Attributes" is not present in the queue corresponding to the cloud print-compatible printer 104 in the cloud print service 321, the cloud print service 321 does not return a value associated with the attribute. The capability information acquired in step S803 is absolutely capability information about which the OS 313 inquires regardless of the type or the capability of a printer connected to the OS 313.

In step S804, the OS 313 updates the device capability information using the capability information acquired from the cloud print service 321. The OS 313 adds the capability information acquired in step S803 in FIG. 8 to the device capability information generated in step S3012 in FIG. 3. If there is an update of the device capability information, the process of step S803 is performed, whereby it is possible to update the device capability information managed by the client terminal 101. In the update of the device capability information in step S804, the device capability information is updated regarding only attribute values defined as industry standard specifications.

Next, in step S805, the OS 313 notifies the print setting extension app 312 of an event and an application programming interface (API) used to edit the device capability information. The timing of the notification of this event is registered when the print setting extension app 312 is installed on the OS 313 of the client terminal 101.

If the print setting extension app 312 receives this event, the print setting extension app 312 makes an acquisition request to acquire the capability information to the cloud print service 321. The acquisition of the capability information made at this time is the acquisition of the capability information to write setting items and attribute values uniquely defined by the printer vendor to the device capability information.

If the print setting extension app 312 receives the event from the OS 313, then in step S806, the print setting extension app 312 inquires about the capability information regarding the cloud print-compatible printer 104 via the cloud print service 321. At this time, the print setting extension app 312 inquires of the cloud print service 321 about the capability information regarding setting items including setting items unique to the printer vendor and attribute values specific to the printer vendor. Similarly to step S802 in FIG. 8, the inquiry is made using "Get-print-Attributes". The user specifies as item names the item names of setting items about which the user wishes to inquire, thereby acquiring the capability information. In the present exemplary embodiment, the description is given on the assumption that the capability information is acquired regarding setting items including setting items uniquely defined by the printer vendor and attribute values uniquely defined by the printer vendor in step S806. The capability information may be acquired also regarding setting items acquired in the acquisition of the capability information made by the OS 313.

If the print setting extension app 312 inquires of the cloud print-compatible printer 104 about the unique capability information, then in step S807, the cloud print-compatible printer 104 responds to the print setting extension app 312 via the cloud print service 321. The response method at this time is similar to that in step S3011 in FIG. 8. In the present exemplary embodiment, in step S807, the cloud print service 321 returns the capability information regarding the cloud print-compatible printer 104 stored in the cloud print service 321. Alternatively, the cloud print service 321 may receive the request in step S806, reacquire the capability information from the cloud print-compatible printer 104, and return the capability information to the client terminal 101.

If the print setting extension app 312 acquires the capability information from the cloud print-compatible printer 104, then in step S808, the print setting extension app 312 edits the device capability information managed by the OS 313 via a configuration information object. The configuration information object refers to a set of data groups required to edit the device capability information. The print setting extension app 312 cannot directly edit the device capability information held in the OS 313. Thus, the print setting extension app 312 changes the device capability information held in the OS 313 using the configuration information object. The print setting extension app 312 converts the capability information such as "stapleless binding" or "save job in printer" acquired in step S807 in FIG. 8 into the device capability information and adds the device capability information to the configuration information object, thereby editing the device capability information. The processing up to step S808 is performed, whereby the setting items and the attribute values unique to the printer vendor are stored in the device capability information in addition to the capability information regarding the standard setting items acquired according to the inquiry made by the OS 313.

Next, in step S809, the print setting extension app 312 passes the edited device capability information to the OS 313. The OS 313 stores the device capability information acquired from the print setting extension app 312 in association with the print queue.

If the OS 313 updates the device capability information, then in step S810, an object that triggers the display of a user interface (UI) of the print setting extension app 312 is enabled. The object that triggers the display of the UI of the print setting extension app 312 is, for example, an object 1104 in FIG. 11. The object 1104 is grayed out until the process of step S810 is completed. Even when the user clicks the object 1104, a print setting screen of the print setting extension app 312 is not displayed. If the process of step S810 is completed, the graying out of the object 1104 is cancelled, and the user can select the object 1104.

If the user selects the object 1104, then in step S811, the print setting extension app 312 starts and displays a print setting screen as illustrated in FIGS. 10A to 10E. The print setting screen does not depend on the type of the document generation app 315 to be used.

If the print setting extension app 312 is not associated with the selected print queue, a standard print setting screen provided in advance in the OS 313 is displayed as illustrated in FIG. 9A. On the standard print setting screen, an "advanced settings" button 901 is pressed, thereby displaying an advanced print setting screen in FIG. 9B for setting setting items that cannot be displayed in FIG. 9A. The advanced print setting screen illustrated in FIG. 9B can be scrolled by operating a scroll bar, and print settings can be made regarding a plurality of setting items supported by the OS 313 as illustrated in FIGS. 9C and 9D. An "OK" button 902 is selected, whereby it is possible to save the print settings made on the advanced print setting screen and return to the screen in FIG. 9A. An "apply" button 903 in FIG. 9A is a button for saving the print settings. A "cancel" button 904 is a button for returning to the screen in FIG. 11 without saving the print settings. If an "OK" button 905 is selected, the print settings are saved, and the standard print setting screen returns to the screen in FIG. 11. In FIGS. 9A to 9D, print setting items and attribute values uniquely defined by the printer vendor cannot be set.

The description returns to the print setting extension app 312. The print setting extension app 312 receives print setting information generated based on the print setting capability information generated from the device capability information by the OS 313 and displays the extension print setting screen illustrated in FIG. 10A. The extension print setting screen can be scrolled by operating a scroll bar as illustrated in FIGS. 10A to 10E, and the setting values of various print setting items can be set.

For example, an output sheet size as a setting item 1001 in FIG. 10A is print setting information generated from "psk:PageMediaSize" in FIGS. 6B-1 and 6B-2. "A4" as an option for the output sheet size is generated based on information such as print setting information "psk:IOSA4" and displayed by the print setting extension app 312. As described above, the print setting extension app 312 converts the device capability information into setting values and displays the extension print setting screen. Since the extension print setting screen is generated from the device capability information including the capability information regarding setting items specific to the printer vendor, it is possible to set setting items and setting values that cannot be set on the screens illustrated in FIGS. 9A to 9D provided by the OS 313.

Figure 10E:
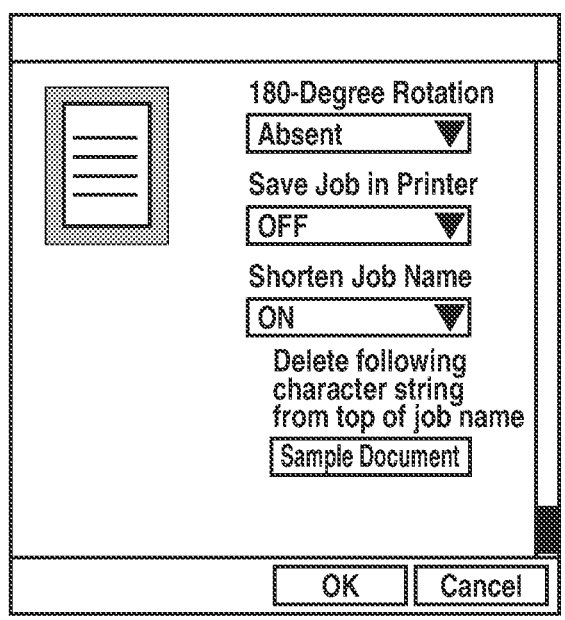
Figure 11:
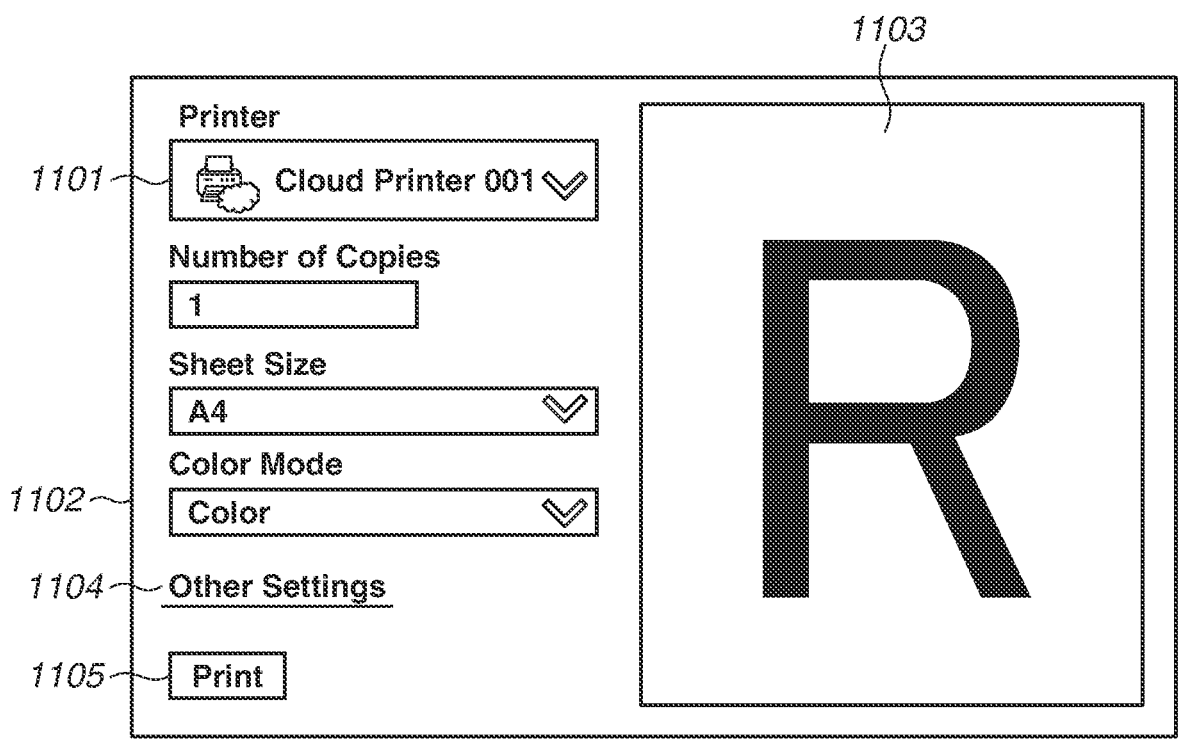
FIG. 11 is a diagram illustrating an example of a print setting screen displayed by a document generation app according to the present exemplary embodiment.

The user selects an object 1002 on the screen in FIG. 10A displayed by the print setting extension app 312. The object 1002 is an object for finalizing print settings. The print setting extension app 312 provides a function for the user to arbitrarily change a print setting. If the user changes a print setting, the print setting extension app 312 saves the setting value of the print setting. For example, if the user changes the medium size from "A4" to "Letter" on the UI, the print setting information held in the print setting extension app 312 changes from "A4" to "Letter". If the object 1002 is selected, the print setting extension app 312 acquires the print setting information processed under control of the print setting screen from the print setting screen and passes the print setting information to the OS 313. If the print setting extension app 312 passes the print setting information to the OS 313, then in step S812, the print setting extension app 312 ends the display of the print setting screen illustrated in FIGS. 10A to 10E. If the process of step S812 is completed, the print setting screen illustrated in FIG. 11 is displayed. The print setting screen displayed at this time is a screen where the setting values set by the print setting extension app 312 are set.

If the user selects an object 1105 on the screen illustrated in FIG. 11, a print instruction is input to the OS 313. In step S813, the OS 313 executes processing related to printing based on the instruction input via the document generation app 315.

If the instruction to execute printing is given, then in step S814, the OS 313 generates intermediate data and passes the generated intermediate data and the print setting information edited on the print setting screen to the print setting extension app 312. The intermediate data is data generated before being converted into print data such as page description language (PDL) data, and for example, corresponds to Extensible Markup Language (XML) Paper Specification (XPS). The print setting information is also included in the intermediate data.

If the print setting extension app 312 receives the intermediate data and the print setting information from the OS 313, then in step S815, the print setting extension app 312 generates print data based on the intermediate data and generates printing capability information based on the print setting information. The print data refers to Portable Document Format (PDF) data such as a PDF file. Specifically, the printing capability information is information describing the print setting information with attribute values defined by the IPP.

After the print setting extension app 312 generates the print data, then in step S816, the print setting extension app 312 passes the generated print data and printing capability information to the print queue in the OS 313.

Steps S814 to S816 are processes in a case where the print setting extension app 312 associated with the print queue is installed on the client terminal 101. If the print setting extension app 312 is not installed on the client terminal 101, the client terminal 101 executes the process described below in step S816. In step S817, the OS 313 generates XPS data, edits a page layout, converts the XPS data into a predetermined format, and generates print data and printing capability information. The predetermined format is, for example, PDF or Printer Working Group (PWG) Raster.

In step S818, the OS 313 transmits the print data and the printing capability information passed from the print setting extension app 312 or the print data and the printing capability information generated by the OS 313 to the cloud print service 321 via the print queue.

In step S819, the cloud print service 321 transmits the print data and the printing capability information passed from the client terminal 101 to the cloud print-compatible printer 104. In the present exemplary embodiment, if the cloud print service 321 receives the print data and the printing capability information, the cloud print service 321 transmits the received print data and capability information to the cloud print-compatible printer 104. Alternatively, the cloud print-compatible printer 104 may periodically inquire of the cloud print service 321 and acquire print data that has not been printed and printing capability information corresponding to the print data.

In the above manner, it is possible to transmit print data on which print settings made using the print setting extension app 312 are reflected to the cloud print-compatible printer 104 via the cloud print service 321.

Figure 12:
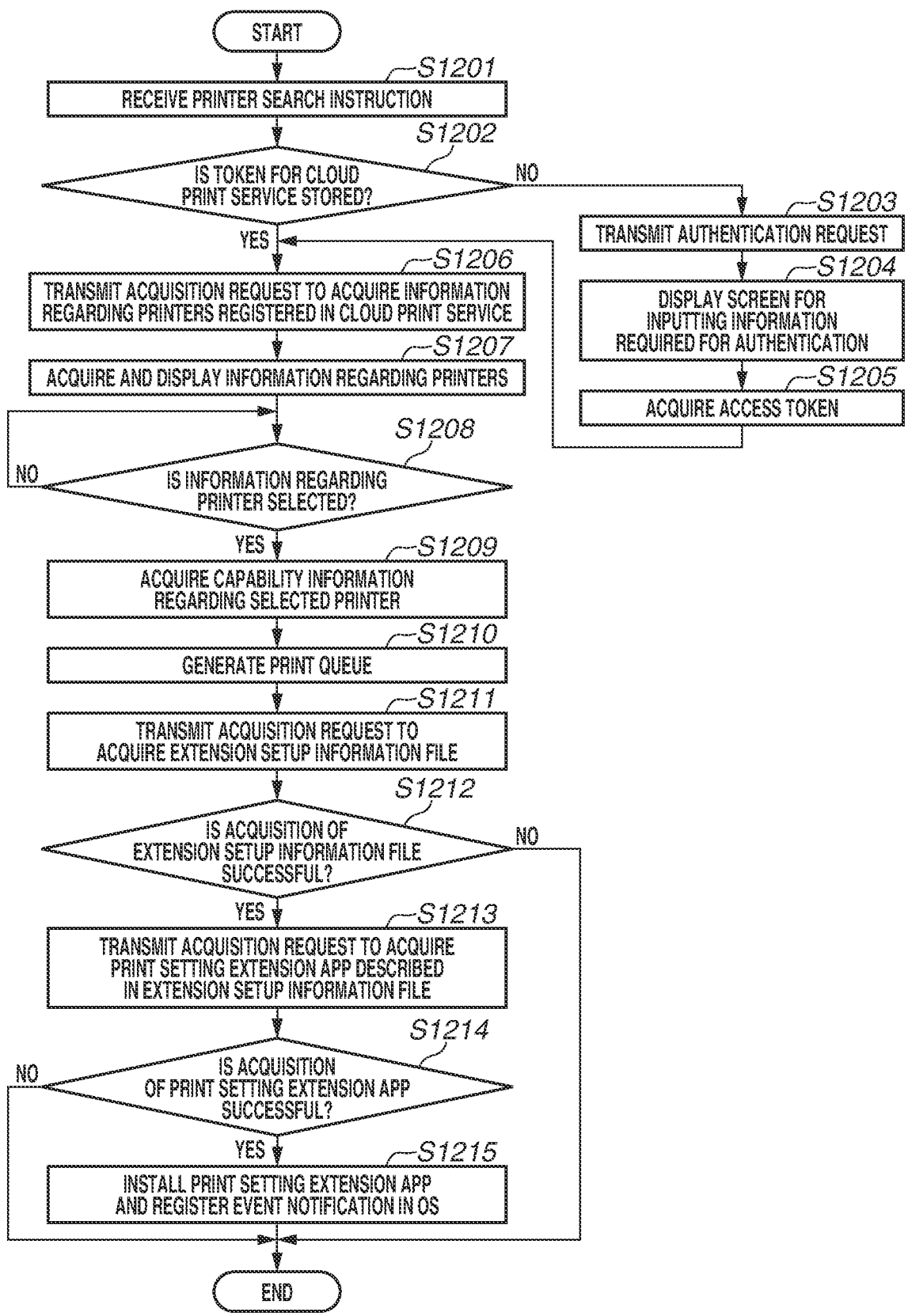
FIG. 12 is a flowchart illustrating a process for installing the print setting extension app on the client terminal according to the present exemplary embodiment.

FIG. 12 is a flowchart illustrating the processing of the OS 313 until the print setting extension app 312 is installed on the client terminal 101. A program for executing the processing described in this flowchart is stored in the storage unit 214 of the client terminal 101. The processing is achieved by the CPU 212 executing the program.

In step S1201, the CPU 212 displays the screen illustrated in FIG. 4 and receives a printer search instruction. If the user selects the object 401 in FIG. 4, the CPU 212 receives a printer search instruction.

In step S1202, the CPU 212 determines whether an access token for the cloud print service 321 is stored. The client terminal 101 stores an access token for acquiring information from the cloud print service 321 with respect to each user who logs into the client terminal 101. The CPU 212 determines whether an access token associated with a user logged into the client terminal 101 is stored. If the access token is stored (YES in step S1202), the processing proceeds to step S1206.

If the access token is not stored (NO in step S1202), then in step S1203, the CPU 212 transmits an authentication request to the cloud print service 321. Then, the CPU 212 receives from the cloud print service 321 a URL used to display a screen for inputting information required for the authentication.

In step S1204, the CPU 212 accesses the received URL and displays the screen for inputting information for use in the authentication. The information for use in the authentication is, for example, a user ID and a password.

In step S1205, the CPU 212 transmits the input information for use in the authentication to the cloud print service 321 and acquires the access token. If the authentication in the cloud print service 321 fails, the CPU 212 cannot acquire the access token, and the processing illustrated in FIG. 12 ends.

In step S1206, the CPU 212 transmits an acquisition request to acquire information regarding printers registered in the cloud print service 321 to the cloud print service 321 using the access token. The cloud print service 321 selects information regarding printers that the user identified by the received access token can use, and transmits the selected information to the client terminal 101. At this time, printer names registered in association with the printers that the user identified by the access token received from the client terminal 101 can use and the HWIDs of the printers are transmitted to the client terminal 101.

In step S1207, the CPU 212 displays the information regarding the printers acquired from the cloud print service 321 on the display unit 216 of the client terminal 101. The display in step S1207 is performed, whereby the information regarding the printers is displayed in a list in the area 402 in FIG. 4.

In step S1208, the CPU 212 determines whether information regarding a printer is selected. The CPU 212 repeatedly performs the process of step S1208 until information regarding a printer is selected. If information regarding a printer is selected (YES in step S1208), the CPU 212 executes the process described in step S1209.

In step S1209, the CPU 212 transmits an acquisition request to acquire capability information regarding the selected printer to the cloud print service 321. At this time, the CPU 212 inquires of the cloud print service 321 about setting items registered in advance in the OS 313.

In step S1210, based on the information acquired from the cloud print service 321, the CPU 212 updates the capability information regarding the printer stored in the client terminal 101 and generates a print queue.

In step S1211, the CPU 212 transmits an acquisition request to acquire the extension setup information file 700 to the online support service 351. The acquisition request includes the HWID of the printer.

In step S1212, the CPU 212 determines whether the acquisition of the extension setup information file 700 is successful. If the acquisition of the extension setup information file 700 is successful (YES in step S1212), the processing proceeds to step S1213. If the acquisition of the extension setup information file 700 fails (NO in step S1212), the processing illustrated in FIG. 12 ends.

In step S1213, the CPU 212 transmits an acquisition request to acquire the print setting extension app 312 described in the acquired extension setup information file 700 to the application management service 331. The CPU 212 acquires the app identifier of the print setting extension app 312 from the extension setup information file 700, specifies the acquired app identifier, and transmits an acquisition request to acquire the print setting extension app 312 to the application management service 331.

In step S1214, the CPU 212 determines whether the acquisition of the print setting extension app 312 is successful. If the acquisition of the print setting extension app 312 fails (NO in step S1214), the processing illustrated in FIG. 12 ends. If the acquisition of the print setting extension app 312 is successful (YES in step S1214), the CPU 212 executes the process described in step S1215.

In step S1215, the CPU 212 installs the acquired print setting extension app 312 and registers the app identifier of the print setting extension app 312 in association with the print queue. Further, the OS 313 registers an event indicating the timing of a notification. At this time, the OS 313 registers the event so that if the print queue associated with the print setting extension app 312 is selected on a print setting screen displayed by a document app, the print setting extension app 312 is notified of the event.

This is the processing until the print setting extension app 312 is registered in the client terminal 101.

Next, a description will be given of the process of making print settings using the installed print setting extension app 312 and generating print data with reference to FIG. 13. A program for executing the processing illustrated in FIG. 13 is stored in the print setting extension app 312. The program is loaded into the memory 213 of the client terminal 101 and executed by the CPU 212.

In step S1301, the CPU 212 determines whether an event notification is received. The event refers to an event issued by the OS 313 and an event for notifying the print setting extension app 312 of the timing registered in step S1215 in FIG. 12. If the event notification is not received (NO in step S1301), the CPU 212 repeatedly performs the process described in step S1301.

If the event notification is received (YES in step S1301), the CPU 212 executes the process described in step S1302.

In step S1302, the CPU 212 transmits an acquisition request to acquire the capability information to the cloud print service 321. The CPU 212 transmits an acquisition request to acquire the capability information regarding setting items set for the print setting extension app 312 to the cloud print service 321. At this time, the CPU 212 acquires the capability information also regarding setting items that are not acquired in step S1206 in FIG. 12.

In step S1303, the CPU 212 determines whether the acquisition of the capability information is completed. If the acquisition of the capability information is not completed (NO in step S1303), the CPU 212 repeatedly performs the process described in step S1303. If the acquisition of the capability information is completed (YES in step S1303), the CPU 212 executes the process described in step S1304.

In step S1304, the CPU 212 updates the device capability information using the acquired capability information. The process of step S1304 is performed, whereby the capability information regarding setting items that are not to be acquired by the OS 313 is also stored in the client terminal 101.

In step S1305, the CPU 212 determines whether an instruction to display the print setting screen by the print setting extension app 312 is received. The instruction to display the print setting screen by the print setting extension app 312 is, for example, an instruction issued based on a user operation such as the selection of the object 1104 in FIG. 11. If the instruction to display the print setting screen is not received (NO in step S1305), the processing proceeds to step S1309. If the instruction to display the print setting screen is received (YES in step S1305), the CPU 212 executes the process described in step S1306.

In step S1306, based on the device capability information updated in step S1304, the CPU 212 displays the print setting screen illustrated in FIGS. 10A to 10E. Then, the CPU 212 receives a user operation for selecting a setting value via the displayed print setting screen.

In step S1307, the CPU 212 determines whether an instruction to end the display of the print setting screen by the print setting extension app 312 is given. If the instruction to end the display of the print setting screen is not given (NO in step S1307), the CPU 212 performs the process described in step S1307. If the instruction to end the display of the print setting screen is given (YES in step S1307), the CPU 212 executes the process described in step S1308.

In step S1308, the CPU 212 edits the print setting information using setting values selected on the print setting screen displayed by the print setting extension app 312. Then, the CPU 212 ends the display of the print setting screen by the print setting extension app 312.

In step S1309, the CPU 212 determines whether the print setting extension app 312 receives intermediate data from the OS 313. If the print setting extension app 312 does not receive intermediate data (NO in step S1309), the processing returns to step S1305. If the print setting extension app 312 receives intermediate data (YES in step S1309), the processing proceeds to step S1310.

In step S1310, the CPU 212 generates print data and printing capability information based on the intermediate data received by the print setting extension app 312. Based on the intermediate data and the print setting information, the CPU 212 generates image data in a predetermined format. Based on the print setting information, the CPU 212 also generates printing capability information described with attribute values defined by the IPP. In the printing capability information, values can also be freely described in addition to the attribute values defined by the IPP. Thus, setting items and attribute values uniquely defined by the printer vendor can also be described in the printing capability information.

In step S1311, the CPU 212 provides the generated print data to the OS 313. The OS 313 transmits the received data to the cloud print service 321 via the print queue.

This is the flowchart illustrating the processing when print settings are made using the print setting extension app 312, and print data and printing capability information are generated.

The above processing is performed, whereby, in a case where a print queue associated with a general-purpose cloud printer driver or a local printer driver is selected and print data is transmitted, it is possible to set the setting values of setting items unique to a printer vendor.

Other Exemplary Embodiments

Embodiments of the present disclosure can be achieved also by performing the following process. This is the process of supplying software (a program) for achieving the functions of the above exemplary embodiments to a system or an apparatus via a network or various storage media, and of causing a computer (or a CPU or a microprocessor unit (MPU)) of the system or the apparatus to read and execute a program code. In this case, the computer program and a storage medium that stores the computer program constitute embodiments of the present disclosure.

Based on an information processing apparatus according to the present exemplary embodiment, before a print setting screen for setting values unique to a vendor is displayed, it is possible to acquire capability information including setting items unique to the vendor.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-068064, filed Apr. 18, 2022, which is hereby incorporated by reference herein in its entirety.

What is claimed is:

1. An information processing apparatus that stores a printer driver configured to generate image data to be transmitted according to a predetermined protocol, the information processing apparatus comprising at least one processor operating to:
　select printer information regarding a single printer from stored printer information regarding a plurality of printers;
　give a notification to an application on the information processing apparatus, the application corresponding to the selected printer information;
　acquire, based on an instruction given by the application having received the notification, first capability information that is defined by the predetermined protocol and second capability information that is not defined by the predetermined protocol from a cloud print service; and
　cause a screen to display, based on the acquired second capability information, an object that receives a print setting.

2. The information processing apparatus according to claim 1, wherein the application is an application that is started according to a start of an operating system of the information processing apparatus and operates in a background on the information processing apparatus.

3. The information processing apparatus according to claim 1, wherein, according to a user operation for selecting a printer registered in the cloud print service as a printer for use in printing, the printer information is selected.

4. The information processing apparatus according to claim 3, wherein the object is displayed based on selection of a predetermined object displayed on a screen that receives the user operation.

5. The information processing apparatus according to claim 1, wherein the second capability information includes information indicating that the single printer is allowed to use a function of binding sheets without using a staple.

6. A control method for controlling an information processing apparatus that stores a printer driver configured to generate image data to be transmitted according to a predetermined protocol, the control method comprising:
- selecting printer information regarding a single printer from stored printer information regarding a plurality of printers;
- giving a notification to an application on the information processing apparatus, the application corresponding to the selected printer information;
- based on an instruction given by the application having received the notification, acquiring first capability information that is defined by the predetermined protocol and second capability information that is not defined by the predetermined protocol from a cloud print service; and
- based on the acquired second capability information, causing a screen to display an object that receives a print setting.

7. The control method according to claim 6, wherein the application is an application that is started according to a start of an operating system of the information processing apparatus and operates in a background on the information processing apparatus.

8. The control method according to claim 6, wherein according to a user operation for selecting a printer registered in the cloud print service as a printer for use in printing, the printer information is selected.

9. The control method according to claim 8, wherein the object is displayed based on selection of a predetermined object displayed on a screen that receives the user operation.

10. The control method according to claim 6, wherein the second capability information includes information indicating that the single printer is allowed to use a function of binding sheets without using a staple.

11. A non-transitory computer-readable storage medium storing a program for causing an information processing apparatus that stores a printer driver configured to generate image data to be transmitted according to a predetermined protocol to execute a control method for controlling the information processing apparatus, the control method comprising:
- selecting printer information regarding a single printer from stored printer information regarding a plurality of printers;
- giving a notification to an application on the information processing apparatus, the application corresponding to the selected printer information;
- based on an instruction given by the application having received the notification, acquiring first capability information that is defined by the predetermined protocol and second capability information that is not defined by the predetermined protocol from a cloud print service; and
- based on the acquired second capability information, causing a screen to display an object that receives a print setting.

12. The non-transitory computer-readable storage medium according to claim 11, wherein the application is an application that is started according to a start of an operating system of the information processing apparatus and operates in a background on the information processing apparatus.

13. The non-transitory computer-readable storage medium according to claim 11, wherein according to a user operation for selecting a printer registered in the cloud print service as a printer for use in printing, the printer information is selected.

14. The non-transitory computer-readable storage medium according to claim 13, wherein the object is displayed based on selection of a predetermined object displayed on a screen that receives the user operation.

15. The non-transitory computer-readable storage medium according to claim 11, wherein the second capability information includes information indicating that the single printer is allowed to use a function of binding sheets without using a staple.

* * * * *